United States Patent
Danilak

(10) Patent No.: US 11,755,528 B2
(45) Date of Patent: *Sep. 12, 2023

(54) SYSTEM AND METHOD OF POPULATING AN INSTRUCTION WORD

(71) Applicant: TACHYUM LTD., San Jose, CA (US)

(72) Inventor: Radoslav Danilak, Cupertino, CA (US)

(73) Assignee: Tachyum Ltd., Las Vegas, NV (US)

( * ) Notice: Subject to any disclaimer, the term of this patent is extended or adjusted under 35 U.S.C. 154(b) by 4 days.

This patent is subject to a terminal disclaimer.

(21) Appl. No.: 17/463,760

(22) Filed: Sep. 1, 2021

(65) Prior Publication Data
US 2022/0066982 A1 Mar. 3, 2022

Related U.S. Application Data

(63) Continuation of application No. 16/540,305, filed on Aug. 14, 2019, now Pat. No. 11,144,497.
(Continued)

(51) Int. Cl.
*G06F 8/41* (2018.01)
*G06F 8/75* (2018.01)
(Continued)

(52) U.S. Cl.
CPC ............ *G06F 15/78* (2013.01); *G06F 9/3869* (2013.01); *G06F 7/57* (2013.01); *G06F 8/433* (2013.01);
(Continued)

(58) Field of Classification Search
CPC .. G06F 15/78; G06F 15/8007; G06F 15/7867; G06F 9/3869; G06F 9/30007;
(Continued)

(56) References Cited

U.S. PATENT DOCUMENTS 5,227,989 A 7/1993 Jones, Jr. et al.
5,457,644 A 10/1995 McCollum
(Continued)

OTHER PUBLICATIONS

Jeremy W. Sherman, Compiling Imperative and Functional Languages, May 2008, [Retrieved on Mar. 9, 2023], Retrieved from the internet: <URL: https://jeremywsherman.com/papers/jws-compiling-baccalaureate.pdf> 274 Pages (1-274) (Year: 2008).*
(Continued)

*Primary Examiner* — Anibal Rivera
(74) *Attorney, Agent, or Firm* — Polsinelli PC

(57) ABSTRACT

A methodology for populating an instruction word for simultaneous execution of instruction operations by a plurality of ALUs in a data path is provided. The methodology includes: creating a dependency graph of instruction nodes, each instruction node including at least one instruction operation; first selecting a first available instruction node from the dependency graph; first assigning the selected first available instruction node to the instruction word; second selecting any available dependent instruction nodes that are dependent upon a result of the selected first available instruction node and do not violate any predetermined rule; second assigning to the instruction word the selected any available dependent instruction nodes; and updating the dependency graph to remove any instruction nodes assigned during the first and second assigning from further consideration for assignment.

15 Claims, 29 Drawing Sheets

Related U.S. Application Data

(60) Provisional application No. 62/764,767, filed on Aug. 16, 2018.

(51) Int. Cl.

| | | |
|---|---|---|
| *G06F 11/36* | (2006.01) | |
| *G06F 9/30* | (2018.01) | |
| *G06F 9/38* | (2018.01) | |
| *G06F 15/78* | (2006.01) | |
| *G06F 7/57* | (2006.01) | |
| *G06F 16/901* | (2019.01) | |

(52) U.S. Cl.
CPC ............ *G06F 8/443* (2013.01); *G06F 8/4441* (2013.01); *G06F 9/30007* (2013.01); *G06F 9/30145* (2013.01); *G06F 9/3836* (2013.01); *G06F 9/3838* (2013.01); *G06F 9/3853* (2013.01); *G06F 9/3885* (2013.01); *G06F 9/3889* (2013.01); *G06F 16/9024* (2019.01)

(58) Field of Classification Search
CPC .. G06F 9/30145; G06F 9/3636; G06F 9/3838; G06F 9/3853; G06F 9/3885; G06F 9/3889; G06F 9/3836; G06F 9/3851; G06F 9/30036; G06F 9/30043; G06F 9/30047; G06F 9/3802; G06F 9/3004; G06F 9/3005; G06F 16/9024; G06F 7/57; G06F 8/433; G06F 8/443; G06F 8/4441

See application file for complete search history.

(56) References Cited

U.S. PATENT DOCUMENTS

| | | | |
|---|---|---|---|
| 5,710,935 A | 1/1998 | Barker et al. | |
| 5,884,060 A | 3/1999 | Vegesna et al. | |
| 5,963,746 A | 10/1999 | Barker et al. | |
| 6,023,757 A | 2/2000 | Nishimoto et al. | |
| 6,065,126 A | 5/2000 | Tran et al. | |
| 6,230,303 B1 | 5/2001 | Dave | |
| 6,324,639 B1 | 11/2001 | Heishi et al. | |
| 6,490,673 B1 | 12/2002 | Heishi et al. | |
| 6,609,189 B1 | 8/2003 | Kuszmaul et al. | |
| 6,766,440 B1 | 7/2004 | Steiss et al. | |
| 6,839,357 B1 | 1/2005 | Gay-Bellile et al. | |
| 7,657,882 B2 | 2/2010 | Oskin et al. | |
| 7,840,914 B1 | 11/2010 | Agarwal et al. | |
| 8,265,144 B2 * | 9/2012 | Christoffersen | H04N 19/91 375/240.1 |
| 8,521,800 B1 | 8/2013 | Bergland et al. | |
| 9,554,134 B2 * | 1/2017 | Sermadevi | H04N 19/42 |
| 9,612,836 B2 | 4/2017 | Ohannessiam et al. | |
| 2001/0029590 A1 | 10/2001 | Sager et al. | |
| 2003/0135710 A1 | 7/2003 | Farwell et al. | |
| 2003/0188299 A1 * | 10/2003 | Broughton | G06F 8/445 717/141 |
| 2004/0068331 A1 | 4/2004 | Cronquist | |
| 2004/0068711 A1 | 4/2004 | Gupta et al. | |
| 2004/0154006 A1 | 8/2004 | Heishi et al. | |
| 2004/0193837 A1 | 9/2004 | Devaney et al. | |
| 2005/0076187 A1 | 4/2005 | Claydon | |
| 2005/0086649 A1 | 4/2005 | Vorbach et al. | |
| 2005/0134308 A1 | 6/2005 | Okada et al. | |
| 2006/0288196 A1 | 12/2006 | Unsal et al. | |
| 2007/0011680 A1 | 1/2007 | Hill | |
| 2007/0198971 A1 | 8/2007 | Dasu et al. | |
| 2009/0213128 A1 | 8/2009 | Chen | |
| 2011/0238948 A1 | 9/2011 | Vorbach et al. | |
| 2012/0216012 A1 * | 8/2012 | Vorbach | G06F 9/3889 712/E9.003 |
| 2013/0205123 A1 | 8/2013 | Vorbach | |
| 2014/0195779 A1 | 7/2014 | Nicol et al. | |
| 2017/0083324 A1 | 3/2017 | Burger et al. | |
| 2017/0083325 A1 | 3/2017 | Burger et al. | |
| 2017/0083327 A1 | 3/2017 | Burger et al. | |
| 2017/0083328 A1 | 3/2017 | Burger et al. | |
| 2017/0083329 A1 | 3/2017 | Burger et al. | |
| 2017/0083330 A1 | 3/2017 | Burger et al. | |
| 2017/0123794 A1 | 5/2017 | Chen et al. | |
| 2017/0161078 A1 | 6/2017 | Altevogt et al. | |
| 2017/0177517 A1 | 6/2017 | Nicol et al. | |
| 2017/0192481 A1 | 7/2017 | Vorbach et al. | |
| 2018/0113713 A1 | 4/2018 | Cheng et al. | |
| 2018/0165199 A1 | 6/2018 | Brandt et al. | |
| 2018/0218005 A1 | 8/2018 | Kuhtz et al. | |
| 2018/0293102 A1 | 10/2018 | Ray et al. | |
| 2018/0314249 A1 | 11/2018 | Appu et al. | |
| 2018/0329708 A1 | 11/2018 | Burger et al. | |
| 2019/0180406 A1 | 6/2019 | Yang et al. | |
| 2019/0339967 A1 | 11/2019 | Moondhra et al. | |
| 2020/0210158 A1 | 7/2020 | Bucuvalas et al. | |

OTHER PUBLICATIONS

Marshall et al., A Reconfigurable Arithmetic Array for Multimedia Applications, 1999, pp. 135-143.
International Search Report dated Nov. 4, 2019 issued in counterpart Patent Application No. PCT/US2019/046630 (2 pages).
Written Opinion dated Report dated Nov. 4, 2019 issued in counterpart Patent Application No. PCT/US2019/046630 (8 pages).
Burger et al., "Scaling to the End of Silicon with EDGE Architectures", Computer, vol. 37, No. 7, Jul. 2004, pp. 44-55.
Kamaraju et al., "Power Optimized ALU for Efficient Datapath", International Journal of Computer Applications (0975-8887), vol. 11—No. 11, Dec. 2010, pp. 39-43.
Kumar et al., "Bit-Sliced Datapath for Energy-Efficient High Performance Microprocessors", PACS 2004, pp. 35-45.
Mercaldi et al., "Instruction Scheduling for a Tiled Dataflow Architecture", ACM SIGARCH Computer Architecture News, vol. 34, No. 5, Oct. 2006, pp. 141-149.
Singh et al., "Design and Analysis of Routed Inter-ALU Networks for ILP Scalability and Performance", Technical Report TR-03-17, Jul. 2003, pp. 1-22.
Swanson et al., "WaveScaler", Appears in the 36th International Symposium on Microarchitecture (MICRO-36 2003), pp. 1-12.

* cited by examiner

250

2002

2004

SYSTEM AND METHOD OF POPULATING AN INSTRUCTION WORD

CROSS REFERENCE TO RELATED APPLICATIONS

This application is a Continuation of U.S. patent Ser. No. 11/144,497, entitled SYSTEM AND METHOD OF POPULATING AN INSTRUCTION WORD, filed on Aug. 14, 2019 which claims priority to U.S. Provisional Patent Application No. 62/764,767 entitled SYSTEM AND METHOD FOR LOCATION AWARE PROCESSING filed Aug. 16, 2018, the contents of which are expressly incorporated herein by reference in their entireties.

FIELD OF THE INVENTION

The various embodiments described herein relate generally to processors with high clock speed. More specifically, embodiments of the application relate to a processing architecture and related methodology that utilizes location-aware processing that assigns Arithmetic Logic Units (ALU) in a processor to instruction operations based on prior allocations of ALUs to prior instruction operations. Such embodiments minimize the influence of internal transmission delay on wires between ALUs in a processor, with a corresponding significant increase in clock speed, reduction in power consumption and reduction in size.

BACKGROUND

In recent years, clock speed of processors in modern computing has substantially plateaued. Referring now to FIG. 1, a logarithmic graph 100 shows the evolution of transistor size, clock speed and performance from 1975-2015 (data adapted from 40 Years of Microprocessor Trend Data, Karl Rupp, Jun. 25, 2015). Transistors have continued to reduce in size along a fairly linear path 102; since smaller transistors are faster than larger transistors, the decrease in transistor size has produced a corresponding increase in transistor switching speed by a factor of eight, roughly every nine years, although this is slowing even more in more recent years. Transistors make up the ALUs inside processors that perform operations.

Prior to 2000, the predominant factor in CPU clock speed and performance was the transistor speed. Thus, from 1975-2000, as transistor size decrease along path 102, clock speed curve 104 improved at a nearly corresponding linear path and performance curve 106 similarly remained along a fairly linear path.

In the early 2000s, clock speed began to peak and performance improvements with each product generation flattened. Despite continuing improvement in transistor size and speed, clock speed showed minimal improvement from 2010-2015. Processor technology was simply no longer able to fully leverage reduction of transistor size into an improvement in clock speed. Performance continued with slight improvement over that time period, although it was relatively modest and largely attributable to other improvements in processor technology.

A reason for the peaking of clock speed is an increased influence of factors other than transistor speed. Prior to 2000 the influence of those factors were so small compared to the influence of transistor speed that these other factors were effectively inconsequential; thus clock speed and performance improvements tracked improvements in transistor speed. However, eventually the transistors became so small and fast that the influence of these other factors was no longer negligible and over time evolved into significant limiting factors. One of these factors is the time of transmission, which is set in part by the amount of time it takes for a signal to complete its travel over a wire from whatever source produced the signal to the ALU that would consume it (which includes technical consideration in such time, including but not limited to charging and inductive effects, leakage, etc.).

The factors of transistor speed and wire delays (time of transmission) both contribute to the clock speed of the supporting system. Modern computing is based on a guarantee of two events occurring within a single clock cycle. First, an Arithmetic Logic Unit ("ALU") will receive and select as inputs from whatever source within the core generated those inputs; this implicates the time of transmission for the inputs to travel from the source to the ALU. Second, the ALU will perform a processing step on the received/selected input(s); this implicates the time of processing.

In this context, the reduction in the size of the transistors and the wires have offsetting effects—the reduction in transistor size decreases the time for processing, while the reduction in wire size increases the time for transmission because thinner wires (in height and width) are more resistant to signal flow.

While the effects are offsetting, historically they have not been comparable. Prior to 2000, the time of processing was so much larger than the time of transmission (e.g., on the order of about 100 times greater) that the time of transmission (even as it was increasing) was negligible to the establishment of clock speed. This is reflected in the pre-2000 time frame of graph 100, where improvements in clock speed and performance tracked improvements in transistor size.

As the size of the transistors and wires continued to reduce, the time of processing continued to decrease, but the time of transmission continued to increase, at a much higher pace. Eventually the gap between the two narrowed to where the time of transmission was no longer negligible compared to the time of processing, and as such, the increasing transmission time became an increasingly consequential offsetting factor against the time of processing.

This is understood in context by the layout of ALUs within a core. Referring now to FIGS. 2A and 2B, as is known in the art, a core 205 of a processor 250 includes a data path 207 with 4-8 ALUs 202 that execute the program instructions. Data path 207 may include at least one simple ALU (performing functions including, e.g., integer arithmetic (add, subtract), boolean logic (and, or, complement) and shifts (left, right, rotate)) and at least one complex ALU (performing functions including, e.g., integer operations (multiply and divide), floating point operations (add, subtract, multiply, divide) and even mathematical functions (square root, sine, cosine, log, etc.)).

FIG. 2B shows a prior art data path with six ALUs 202 (204, 206, 208, 210, 212 and 214) along a data path 216, of which four (208, 210, 212, 214) are simple ALUs and two (204, 206) are a complex ALUs. The data path 216 includes an operand selection unit 215 for each ALU to collectively define an operand selection network and selects the specific inputs available on data path 216 that are input to its corresponding ALU. Registers 217 present values for use by the ALUs 202, and such values may be provided earlier by prior activity of an ALU.

FIG. 2C provides a more detailed discussion of the layout of FIG. 2B for a layout of ALUs 202 including ALU 204, 206, 208 and 210. Each ALU execution unit 202 is composed of adder 262 and logic unit 263. The adder 262 may be used to calculate address for memory read described by load instruction and for memory write described by store instruction. In addition adder 262 may be used for executing conditional branches. Based on whether the ALU is simple or complex, the logic unit may include bitwise logic unit, shifter, sign extension, logic, and many other operations. Each ALU 202 receives operands through inputs 261 and 262a. The inputs 261 and 262a are coupled to adder 262 and logic unit 263 to provide operands for operation execution. The result from adder 262 is coupled to multiplexor 266 via coupling 264 and results from logic unit 263 is coupled to multiplexor 266 via coupling 265. The multiplexor selects results from adder 264 or logic unit 263 depending on what operation is requested. The result of multiplexor 266 is transferred to output register 268 via coupling 267.

The plurality of operand selection units 215 are shown as 220, 230, 240, 245 are used to select operands for ALUs 204, 206, 208, 210. Each operand selection unit 215 selects operand 261 for ALU 260 by multiplexor 221 coupled to adder 262 and logic 263 via coupling 261. The multiplexor 221 selects operands from memory ports 252 or 254, register 256 using coupling 258, ALU 204 via coupling 269, ALU 206 via coupling 279, ALU 208 via coupling 289, or from ALU 210 via coupling 299. Similarly operand selection unit 220 selects operand 262 for ALU 260 by multiplexor 222 coupled to adder and logic unit via coupling 262. The multiplexor 222 can similarly select from such available inputs, or from immediate operand constant 223.

Data provided by memory ports 252 and 254, as well as the results of ALUs 220, can be written to registers 217 and made available for subsequent computations.

The transmission time of the wires that connect the ALUs 202 has a specific impact on the processor methodology of the prior art. To maintain the guarantee of completing the signal receipt and processing within a single clock cycle, the clock speed must be set to allow for a combination of the worst case scenarios for both the communication and the processing events. On the processing side, the worst case scenario is the most time consuming operation that an ALU would process within a single clock cycle (not including processes that are not expected to complete within one clock cycle). On the transmission side, the worst case scenario is the furthest distance that the input signal would have to travel to reach the ALU that performs the operation. The overall worst case scenario is when an ALU is tasked with the most time consuming processing operation that requires inputs from the furthest distance away.

By way of example in FIG. 2B, for purposes of explanation the most complicated operation that can be completed by an ALU in a single clock cycle is "shift" by one of the complex ALUs 204 or 206. The most complicated transmission distance is for ALU 204 on one end of data path 216 to select inputs from the farthest ALU 214 on the opposite side of the data path. The worst case scenario timewise is when the ALU 204 needs to perform shift based on input from the ALU 214. The clock cycle of the chip for ALUs 202 must be larger than that worst case scenario to guarantee the operation can be performed.

Whatever the worst case scenario is for a particular chip, when the clock cycle is set to allow for the worst case scenario to occur within a single clock cycle, then the clock cycle will be long enough to guarantee that any other (single clock cycle) operation can be performed with that clock cycle, as that other operation will be less taxing in total transmission and processing, and can be performed within the single clock cycle.

In contrast, setting the clock cycle shorter that the worst case scenario would violate that guarantee, as the correct results may not be produced within the clock cycle and other ALUs that are instructed to use the results of that process would receive incorrect information and produce incorrect results themselves. For example in FIG. 2B, if the clock cycle was not long enough for ALU 204 to receive input from ALU 214, then ALU 204 would produce an incorrect output that would propagate to other ALUs that rely upon the output of ALU 204.

The prior art clock cycle may thus be defined by the following equation:

$$\text{Minimum clock cycle time} = t\text{maxglobalcomm} + t\text{maxop} + toh; \text{ and}$$

$$\text{Maximum clock speed} = (1/\text{minimum clock cycle time})$$

where:
tmaxglobalcomm is the maximum amount of time that would be taken for one ALU to receive and select content from another ALU within the data path;
tmaxop is the maximum amount of time that one ALU would take to complete a processing step within a single clock cycle; and
toh is the time allocated to "overhead" parameters as are known in the art, including but not limited to one or more of the following: clock skew and clock jitter, variation of process, temperature or voltage, ground bounce, simultaneous switching, signal integrity, Miller effect, guard band and/or aging.

Referring back to FIG. 1, in the 1990's the time of communication (i.e. wire delay) was negligible compared to time of processing (i.e. transistor switching speed). A typical example of approximate values for that time period may be tmaxop=9.5 nanoseconds (ns), tmaxglobalcomm=200 picoseconds (ps) and toh=300 ps. Thus in this circa 1990's example:

$$\text{Minimum clock cycle time} = 9.5 \text{ ns} + 200\text{ps} + 300\text{ps} =$$

$$10 \text{ ns}$$

$$\text{Maximum clock speed} = 1/10 \text{ ns} = 100 \text{ MHz}$$

This was a common speed for home computers circa 1997. The resulting equation was so dominated (in this example 95%) by the time of processing that the influence of the other factors was minimal (in this example, 5%).

The flattening of the clock speed curve 104 after 2005 in FIG. 1 reflects the narrowing of the gap of the influence of the time factors. Given the size of components circa year 2018, the time of processing for the worst case operation is similar to the time of communications for worst case transmission from one corner of the core to another. By way of example, for a current processor (with massively faster transistor switching speed than 20 years ago, and with significantly more wire delay/time of transmission) approximate values may be tmaxop=120 ps, tmaxglobalcomm=120 ps, and toh=20 ps. Thus in this year 2018 example:

$$\text{Minimum clock cycle time} = 120\text{ps} + 120\text{ps} + 20\text{ps} =$$

$$260\text{ps}$$

$$\text{Maximum clock speed} = (1/260 \text{ ps}) = 3.85 \text{ Ghz}.$$

This was a common speed for home computers circa 2018. Whereas for circa 1997 technology the equation was 95% dominated by the time of processing, for circa 2018 technology the influence of time of processing is similar to that of time of transmission.

The above examples can show practical limits of further reductions in transistor size, and corresponding time of processing. If hypothetically the transistors were improved in speed to reduce the processing time by 85% over the circa 2018 numbers above, then the tmaxop could drop to about 20 ps. This would cause a corresponding reduction in wire size, with a corresponding increase in the worst case time of transmission. Presuming a conservative 20% increase in time of transmission for a one millimeter long wire due to wire size (for a corresponding Tmaxglobalcomm of approximately 140 ps) and keeping other factors the same for purpose of illustration, the parameters for this hypothetical transistor are:

Minimum clock cycle time=20ps+140ps+20ps=180ps

Maximum clock speed=5.55 Ghz

An 85% reduction in processing time (120 ps to 20 ps) relative to current levels represents an enormous investment of time and expense. Yet it would only improve clock speed by about 44% (3.85 Ghz to 5.55 Ghz), which is a poor recovery relative to the underlying investment. The reason for the lack of comparable improvement between the transistor size and clock cycle time is that the influence of time of processing is becoming negligible, while the influence of time of transmission—once itself a negligible factor—has now become dominant.

Efforts have been made to improve clock speed by reducing the time of transmission. Once type of effort was to change the composition of the wires to something with lower resistance, such as from an aluminum based compound to a copper based compound. Another type of effort was to optimize the layout of chip ALUs to minimize the distances that signals had to traverse. Another type of effort was to cool the chips, as cooler wires will have lower resistance with respect to signal transmission.

2. Instruction Execution

Any particular processor is designed with an instruction set architecture (ISA). A common type of ISA is Complex Instruction Set Computing (CISC) where single instructions can execute several low-level machine operations (such as a load from memory, an arithmetic operation, and a memory store) or are capable of multi-step operations or addressing modes within single instructions. Another common ISA is Reduced Instruction Set Computer (RISC), which uses a small set of simple and general instructions, rather than a large set of complex and specialized instructions as in CISC.

CISC and RISC allow programs to specify instructions to execute in sequence only. Another ISA that does not is Very Long Instruction Word (VLIW), in which several instructions can be group into an instruction word, and the multiple instructions in the instruction word can be executed at the same time (i.e. during the same clock cycle), concurrently, in parallel. A limitation of VLIW is that the instructions within any instruction word may not have any direct interdependencies, such as when a first instruction operation's result is used as a second instruction operation's input, then they cannot execute at the same time and the second instruction cannot execute until the first instruction has completed.

BRIEF DESCRIPTION OF THE DRAWINGS

Various embodiments in accordance with the present disclosure will be described with reference to the drawings, in which.

OVERVIEW

Figure 1:
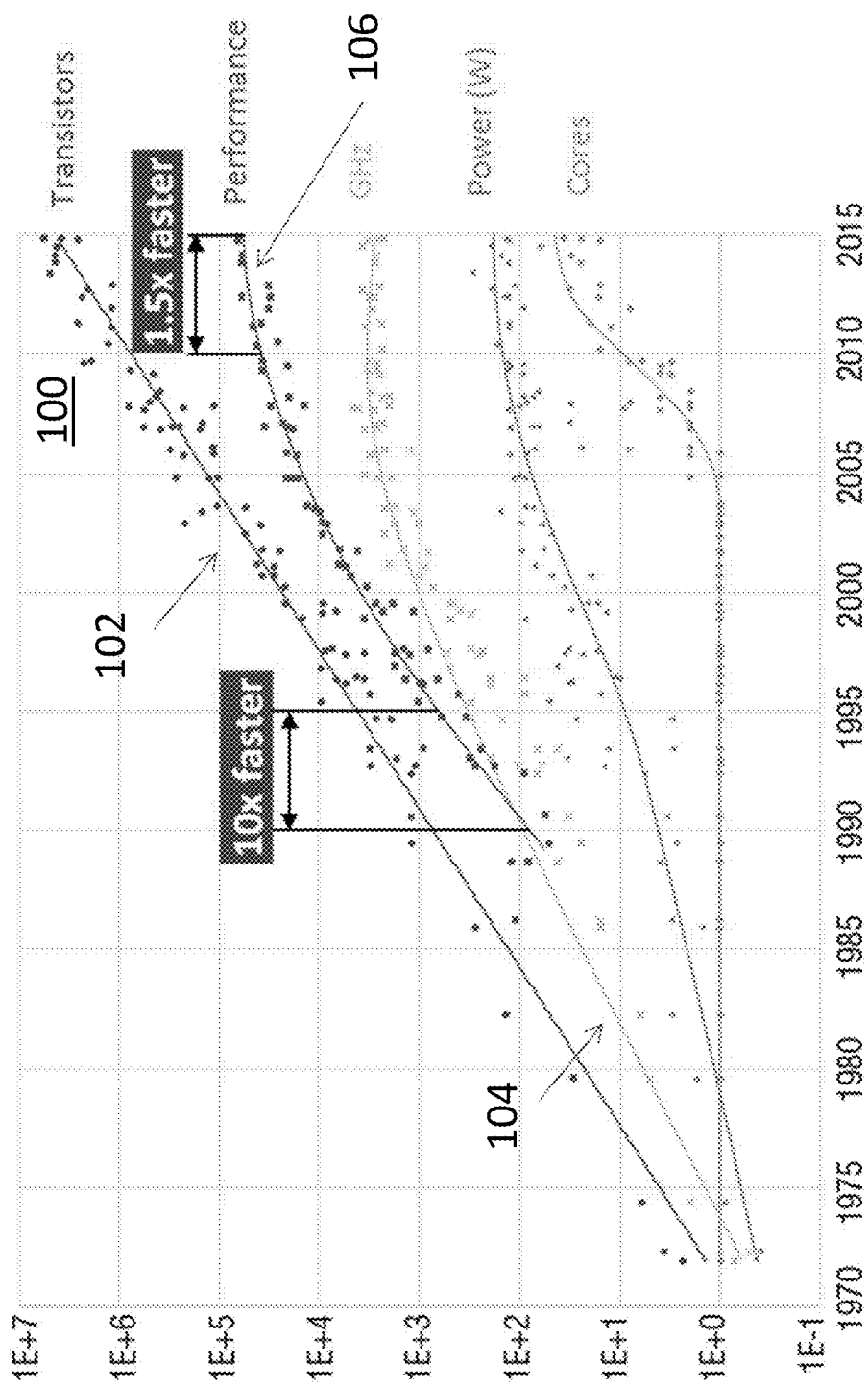
FIG. 1 illustrates a graph of processor parameters from the early 1970s through 2015.

According to an embodiment of the invention, a method for preparing a series of instruction operations for execution on a device is provided. The device has plurality of arithmetic logic units (ALU) within a data path including at least first, second and third ALUs, the second ALU being within a locally predefined range of the first ALU and the third ALU being outside of the locally predefined range of the first ALU, the locally predefined range being smaller than the data path. The method includes: first assigning a first instruction operation to the first ALU; first determining, for a second instruction operation having an input that depends directly on an output of a first instruction operation, whether all inputs for the second instruction operation are available within a locally predefined range from the first ALU; second assigning, in response to at least a positive result of the first determining, the second instruction operation to the second ALU; in response to a negative result of the first determining: ensuring a pause of at least one clock cycle will occur between execution of the first instruction operation and the second instruction operation; and third assigning the second instruction operation to an ALU of the plurality of ALUs.

The operations of the above method embodiment may also be provided in an embodiment as a computer hardware device having a clock speed and a clock cycle, where the device is programmed to execute a series of instructions stored in a non-transitory memory to perform the recited operations. The operations of the above method embodiment may also be provided in an embodiment as a non-transitory computer readable medium storing instructions to perform the operations to assign instruction operations to a device.

The above embodiments may have various optional features. A clock speed of the device can be defined in part on a worst case time of transmission between a consumer ALU and producer ALU of the plurality of ALUs within the locally predefined range. The locally predefined range can be a distance between two adjacent ALUs. The locally predefined range is further defined by inputs and outputs of the two adjacent ALUs facing each other. The first and second ALUs can be the same, and the locally predefined range can be an ALU to itself. The clock cycle of the device can be shorter than an amount of time needed to guarantee that the third ALU (a) receives and selects an input produced from the first ALU and (b) executes the second instruction operation. The ensuring can include second determining whether the first and second instruction operations are already separated in time of execution by at least one clock cycle of the device, and in response to a negative outcome of the second determining, inserting a delay of at least one clock cycle of the device between execution of the first and second instruction operations. The first and second assigning may further comprises setting the first and second instruction operations to be executed during a same clock cycle of the device.

According to an embodiment of the invention, a method for creating and executing instruction words for simultaneous execution of instruction operations by a plurality of Arithmetic Logic Units (ALUs) in a data path operating on a clock cycle is provided. The method includes creating a dependency graph of nodes with instruction operations, the graph including at least a first node having a first instruction operation and a second node having a second instruction operation, the second instruction operation being directly dependent upon the outcome of the first instruction operation; first assigning the first instruction operation to a first instruction word; second assigning a second instruction operation: to the first instruction word upon satisfaction of a first at least one predetermined criteria; and to a second instruction word, that is scheduled to be executed during a later clock cycle than the first instruction word, upon satisfaction of a second at least one predetermined criteria; and executing, in parallel by the plurality of ALUs and during a common clock cycle, any instruction operations within the first instruction word.

The operations of the above method embodiment may also be provided as an embodiment of a system for creating and executing instruction words for simultaneous execution of instruction operations, where the system includes a plurality of Arithmetic Logic Units (ALUs) in a data path operating on a clock cycle and a non-transitory computer readable memory storing instructions, where the system is being programmed to implement the instructions to perform the above operations. The operations of the above method embodiment may also be provided as an embodiment of a non-transitory computer readable medium storing instructions programmed to cooperate with a system to cause the system to perform the above operations to create and execute instruction words for simultaneous execution of instruction operations by a plurality of Arithmetic Logic Units (ALUs) in a data path operating on a clock cycle.

The above embodiments may have various optional features. The second at least one predetermined criteria can be a failure to satisfy the first at least one predetermined criteria. The first at least one predetermined criteria may include the first instruction word has sufficient capacity to hold the second instruction operation. The first at least one predetermined criteria may include both the first and second instruction operations are guaranteed under normal operation to be completed within the same clock cycle. The first at least one predetermined criteria may include the first and second instruction operations are not prohibited by any predefined rule from being in the first instruction word. The first assigning may include assigning the first instruction operation of the first instruction word to a first ALU of the plurality of ALUs. The first at least one predetermined criteria may include that a second ALU of the plurality of ALUs is available within a locally predefined range from a first ALU, the locally predefined range being smaller than the data path. The operations may include ensuring that at least one clock cycle separates execution of the first instruction word and the second instruction word.

According to an embodiment of the invention, a processor has a first group of ALUs including first, second and third ALUs. The first ALU has on a first side an input and an output. The second ALU has a first side facing the first side of the first ALU, an input and an output on the first side of the second ALU and being in a rotated orientation relative to the input and the output of the first side of the first ALU, and an output on a second side of the second ALU. The third ALU has a first side facing the second side of the second ALU, and an input and an output on the first side of the third ALU. The input of the first side of the first ALU is logically directly connected to the output of the first side of the second ALU. The input of the first side of the second ALU is logically directly connected to the output of the first side of the first ALU. The output on the second side of the second ALU is logically directly connected to the input on the first side of the third ALU.

The above embodiment may have various optional features. A pathway may extend between the first and second ALUs, the pathway being a conduit by which data is provided to and received from the first group of ALUs. The pathway may include an operand selection network between the first and second ALUs that controls data flow between the first and second ALUs. The output on the first side of the third ALU may be logically directly connected to the operand selection network. The operand selection network may be logically directly connected to the input and the output on the first side of the first ALU. The operand selection network may be logically directly connected to the input and the output on the first side of the second ALU. The processor may have a clock speed based upon a worst case combination of: (a) a most time consuming process that could be performed in one clock cycle by any of the first, second and/or third ALUs, and (b) a most amount of time it would take for the any of the first, second and/or third ALUs performing (a) to receive any needed inputs from the pathway and remaining ALUs of the first, second and third ALUs. The first and second ALUs may be limited to a first set of types of operations, and the third ALU may be limited to a second set of types of operations, where the second set of types of operations includes more complicated operations than the first set of types of operations. The first side of the first ALU, the first and second sides of the second ALU, and the first side of the third ALU may be in parallel. The second side of the second ALU may lack an input. The processor may include a plurality of groups of ALUs, each of the groups of ALUs having a layout identical to the first group of ALUs.

According to another embodiment of the invention, a processor has a plurality of group of ALUs, each group including first, second and third ALUs. Within each group of ALUs is a first ALU, second ALU, and third ALU. A common pathway extends into each group between the first and second ALUs, the common pathway being a conduit by which data is provided to and received from each group of ALUs and exchanged between the groups of ALUs. The first ALU has on a first side an input and an output. The second ALU has a first side facing the first side of the first ALU, an input and an output on the first side of the second ALU and being in a rotated orientation relative to the input and the output of the first side of the first ALU, and an output on a second side of the second ALU. The third ALU has a first side facing the second side of the second ALU, and an input and an output on the first side of the third ALU. The input of the first side of the first ALU is logically directly connected to the output of the first side of the second ALU. The input of the first side of the second ALU is logically directly connected to the output of the first side of the first ALU. The output on the second side of the second ALU is logically directly connected to the input on the first side of the third ALU.

The above embodiment may have various optional features. The processor may have a clock speed based upon a worst case combination of: (a) a most time consuming process that could be performed in one clock cycle by any of the first, second and/or third ALUs, and (b) a most amount of time it would take for the any of the first, second and/or third ALUs performing (a) to receive any needed inputs from the pathway and remaining ALUs of the first, second and third ALUs. The processor may have a clock speed that is too fast to accommodate a combination of: (a) a most time consuming process that could be performed in one clock cycle by any of the first, second and/or third ALUs within a particular one of the groups of ALUs, and (b) receive any needed inputs from outside the particular one of the groups of ALUs. The pathway may include an operand selection network between the first and second ALUs that controls data flow between the first and second ALUs. The output on the first side of the third ALU may be logically directly connected to the operand selection network. The operand selection network may be logically directly connected to the input and the output on the first side of the first ALU. The operand selection network may be logically directly connected to the input and the output on the first side of the second ALU. Within each of the groups of ALUs the first and second ALUs may be limited to a first set of types of operations, and the third ALU may be limited to a second set of types of operations, where the second set of types of operations includes more complicated operations than the first set of types of operations. Within each of the groups of ALUs the first, second and third ALUs may be aligned in a linear path. Within each of the groups of ALUs the first side of the first ALU, the first and second sides of the second ALU, and the first side of the third ALU may be in parallel. Within each of the groups of ALUs the second side of the second ALU may lack an input.

According to an embodiment of the invention, a method for populating an instruction word for simultaneous execution of instruction operations by a plurality of ALUs in a data path is provided. The method includes: creating a dependency graph of instruction nodes, each instruction node including at least one instruction operation; first selecting a first available instruction node from the dependency graph; first assigning the selected first available instruction node to the instruction word; second selecting any available dependent instruction nodes that are dependent upon a result of the selected first available instruction node and do not violate any predetermined rule; second assigning to the instruction word the selected any available dependent instruction nodes; and updating the dependency graph to remove any instruction nodes assigned during the first and second assigning from further consideration for assignment.

The operations of the above method embodiment may also be provided as an embodiment of a system that includes a plurality of Arithmetic Logic Units (ALUs) in a data path operating on a clock cycle and a non-transitory computer readable memory storing instructions, where the system is programmed to implement the instructions to perform the above operations. The operations of the above embodiment may also be provided as an embodiment of a non-transitory computer readable media storing instructions populating instruction words for simultaneous execution of instruction operations by a plurality of ALUs in a data path, which when executed by a system, cause the system to perform the disclosed operations.

The above embodiment may have various optional features. The operations may include after the second assigning: determining whether the instruction word is complete or incomplete; returning to the first selecting in response to the instruction word being incomplete per the determining; and closing the instruction word in response to the instruction word being complete per the determining. The operations may include creating a new instruction word in response to (a) the closing and (b) the dependency graph still has unassigned instruction nodes. The updating may include (a) removing from the dependency graph any instruction nodes assigned during the first and second assigning, or (b) marking any instruction nodes assigned during the first and second assigning as unavailable for further assignment to the instruction word. The first assigning may assign the selected first available instruction node to a first ALU slot of the instruction word, the first ALU slot corresponding to a first ALU of the plurality of ALUs. The second assigning may assign one of the any available dependent nodes to a second ALU slot of the instruction word, the second ALU slot corresponding to a second ALU of the plurality of ALUs where the first and second ALUs are within a locally predefined range of each other. The operations may include in response to absence of an available node during the first selecting, bypassing the first assigning, second selecting and second assigning. The operations may include initially designating, after the creating, any of the instruction nodes in the dependency graph as global, wherein a global designation represents that the instruction nodes requires inputs that are outside of a predefined physical range of ALUs, the range being smaller than the full extent of the data path, and the any predetermined rule includes that the instruction node may not include an available dependent instruction node that is dependent upon a result of the selected first available instruction node when the an available dependent instruction node is designated as global. The initially designating, in response to being unable to determine whether a particular instruction node is global, may designate the particular instruction node as non-global.

According to an embodiment of the invention, a method for populating multiple instruction words for execution of instruction operations by a plurality of ALUs in a data path is provided. The method includes: creating a dependency graph of instruction nodes, each instruction node including at least one instruction operation; first assigning a first instruction node to a first instruction word; identifying a dependent instruction node that is directly dependent upon a result of the first instruction node; first determining whether the dependent instruction node requires any input from two or more sources that are outside of a predefined physical range of each other, the range being smaller than the full extent of the data path; second assigning, in response to satisfaction of at least one predetermined criteria including a negative result of the first determining, the dependent instruction node to the first instruction word; and third assigning, in response to a negative result of the first determining and violation of any of the at least one predetermined criteria, the dependent instruction node to a second instruction word; wherein execution of the first and second instruction words occur at different clock cycles.

The operations of the above method embodiment may also be provided as an embodiment of a system for populating multiple instruction words for instruction operations, where the system includes a plurality of Arithmetic Logic Units (ALUs) in a data path operating on a clock cycle, a non-transitory computer readable memory storing instructions, and the system is programmed to implement the instructions to perform the operations. The operations of the above method embodiment may also be provided as an embodiment of a non-transitory computer readable media storing instructions for populating multiple instruction words of instruction operations by a plurality of ALUs in a data path, which when executed by a system cause the system to perform the operations.

The above embodiment may have various optional features. The operations may further include fourth assigning, in response to at least a positive result of the first determining, the dependent instruction node to a third instruction word, where execution of the first and third instruction word are separated by at least one clock cycle. The operations may further include optimizing, after the first and second assigning, assignments of instruction nodes of the dependency graph to the first and second instruction words; and executing, after the optimizing, the first and second instruction words. The operations may further include: first executing the first instruction word during a first clock cycle; determining whether executing the second instruction word in a second clock cycle immediately after the first clock cycle would result in at least one violation of at least one predetermined rule; second executing, in response to a negative result of the second determining, the second instruction word during the second clock cycle; delaying execution of the second instruction word, in response to a positive result of second determining, by at least one clock cycle until the at least one violation resolves; and third executing, in response to resolution of the at least one violation, the second instruction word. The delaying may include generating an instruction word that either lacks instruction operations or contains instruction operations for the ALUs to take no action during a corresponding clock cycle. The at least one predetermined rule may include a guarantee that the ALUs will receive all inputs needed for all the instruction operations of the second instruction word and will execute the all the instruction operations of the second instruction word within the second clock cycle.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one embodiment. While specific implementations and other details are discussed, it is to be understood that this is done for illustrative purposes only. An individual skilled in the relevant art will recognize that other components and configurations may be used without departing from the scope and spirit of the claimed subject matter.

Several definitions that apply throughout this disclosure will now be presented. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized, means "including, but not necessarily limited to"; it specifically indicates open-ended inclusion or membership in the so-described combination, group, series and the like. The term "a" means "one or more" absent express indication that it is limited to the singular. "First," "second," etc., are labels to differentiate like terms from each other, and does not imply any order or numerical limitation.

"Core" is a term of art and refers to an independent processing unit found on a processor chip. A processor chip may have multiple cores.

"Arithmetic logic unit" (ALU) is a term of art, and refers to a combinational digital electronic circuit that performs arithmetic and bitwise operations on integer binary numbers.

Two ALUs may have a relationship in which one ALU generates a result as an output and a second ALU receives that output result as an input that the second ALU will use/consume in a further processing step. To distinguish between the two components in that relationship, "producer" refers to the component that generates an output result, and "consumer" refers to the component that consumes the previously generated output result. ALUs can be in multiple producer/consumer relationships, as a single ALU can both receive a result that it consumes (and is thus a consumer ALU) and produces a result from that consumption (and is thus a producer ALU). Components other than ALUs can also be consumers or producers, e.g., a register that provides a value to an ALU is producer.

Figure 3A:
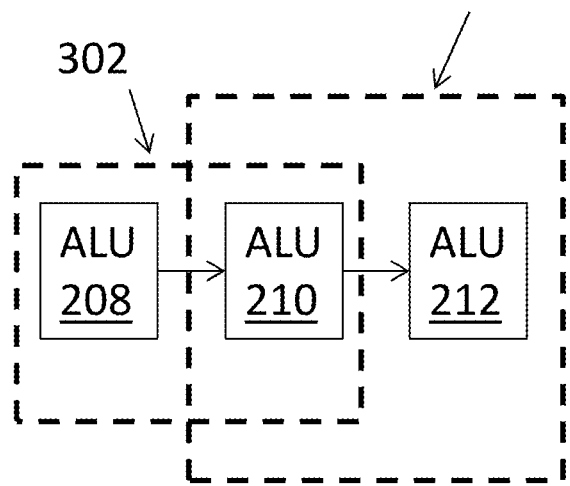
FIGS. 3A and 3B show non-limiting examples of ALUs in producer-consumer relationships.

By way of non-limiting example in FIG. 3A, ALU 208 provides an output to ALU 210, and ALU 210 provides its output to ALU 212. ALU 208 and ALU 210 are thus in a consumer-provider relationship 302 where ALU 208 is a provider and ALU 210 a consumer. ALU 210 and ALU 212 are also in a consumer-provider relationship 304 where ALU 210 is a provider and ALU 212 a consumer; ALU 210 is thus both a consumer ALU in one relationship and a provider ALU in another relationship.

Figure 3B:
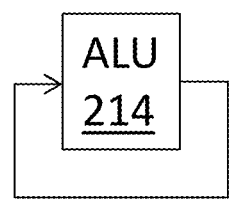

Referring now to FIG. 3B, a specific example of provider-consumer relationship is when an ALU receives as input, feedback from its prior output. In this example, the ALU 214 is both a provider and a consumer in that it provides the output that it consumes as input.

"Data path" refers to the group of ALUs on a core that are specifically dedicated to executing program instructions.

"Local communication," "local," "locally," "locally predefined range" or the like means structures, communications, processes or the like that are contained with a predefined limited physical range of ALUs, which range is smaller than the full extent of the data path. A non-limiting example of local communication is a defined range of communication from an ALU to itself as is shown in FIG. 3B. Another non-limiting example is a defined range of any immediately adjacent ALU, i.e., one ALU distance (e.g., for the layout in FIG. 2B, from ALU 204-206, ALU 206-208, ALU 208-210, etc.). Another non-limiting example is an ALU within a two ALU distance. Another non-limiting example is ALUs in certain directions, such as an adjacent ALU to the left but not the right. Another example is a particular type of ALU relationship (e.g., a mirrored ALU as described below). The invention is not limited to any particular arrangement as local, other than as predefined.

"Global communication," "global," "globally," "non-local communication," "non-local" or the like means structures, communications, processes or the like that require receipt of signals from outside the defined scope of local (e.g., in distance, orientation, and/or relationship). By way of a non-limiting example, if the local communication range is defined by an ALU to itself, then communications from an ALU to any other ALU is a "global communication" (e.g., for the layout in FIG. 2B, ALU 208 to ALU 210 is global because ALU 210 is not ALU 208). In another non-limiting example, if the local communication range is defined by one adjacent ALU, then communications from an ALU to another ALU that is not adjacent is a "global communication" (e.g., for the layout in FIG. 2B, ALU 204 to ALU 206 is local because the two are adjacent, whereas ALU 204 to ALU 208/210/212/214/216 is global because ALU 204 is not adjacent to these others but rather more than one ALU distance away).

Some signals may be global or local by their nature. For example, the values provided by registers may be available at the input of the ALUs with the data pathway and may thus always be local. Non-limiting examples of local may include constants (also called immediate operands), data read from memory over multiple cycles, or data read from a special register, special storage, or special execution unit. Non-limiting examples of global may include ALU bypass network, the result from a complex or specialized execution unit such as multiplier, or data from load execution unit. The invention is not limited to what signals are local or global, other than as may satisfy the predetermined rules for the same.

"Defined," "definition" or the like in the context of local is the various applicable rules that determine whether a particular situation is local or global. It is to be understood that "defined" or the like is used as an open set (e.g., consistent with "comprising") in that a particular definition as discussed herein may have other rules that are not specified. By way of non-limiting example, a "definition" of local for an "immediately adjacent ALU" requires the noted adjacent orientation, but does not exclude other (non-conflicting rules) such as the presence of operand selector switches and/or registers proximate to the ALUs that provide various inputs within the local range.

A "compiler" is computer software operating in combination with hardware that transforms computer code written in one programming language (the source language, usually person-readable) into another computer language (the target language, typically non-human readable). A compiler will typically take program steps of a source program for execution and convert the steps into a series of machine-level final instructions for ALUs to execute. In the compiling process, the various program steps may be reorganized and/or transformed into different related groups as the groups are refined into instructions.

"Instruction operation" or "instruction operations" refers to any collection of operations (including a collection of one) from a program in any state as it transitions from the initial program steps to the final program instructions to be executed by the ALUs.

"Instruction word" refers to a bundle of instructions operations to be executed by at least some of the ALUs in the data path at the same time, concurrently, in parallel, during a common clock cycle. As discussed below, each instruction operation of the instruction word is associated with a particular ALU that will perform that particular instruction operation. An instruction word may be unpopulated (no instructions have yet been associated), referred to as a "bubble." Instruction words are described herein in the singular, although it is to be understood that an instruction word may be plural (e.g., two smaller instruction words can collectively be considered a single instruction word). If the chip has different cores, there may be different instructions words for each core executed in parallel during the same clock cycle.

"Mapped instruction word" refers to a type of instruction word with multiple slots in which each of the slots of the instruction word corresponds to a particular ALU. For multiple mapped instruction words, the slots collectively form columns corresponding to a particular ALU. Multiple instruction words thus define a map of instruction operations to ALUs, in that each row represents the instruction operations to be executed in parallel during a clock cycle while the columns represent the assigned ALUs for those instructions that will be executed in sequential fashion; the opposite could also be used (where each column represents the instruction operations to be executed in parallel during a clock cycle while the rows represent the assigned ALUs for those instructions), although for ease of discussion the following description only further discusses the column=ALUs. Instruction words may have any desirable number of slots, although preferably the number of slots is the same as the number of ALUs in the data path.

When created, a mapped instruction word may be unpopulated, and thereafter some of the slots may be filed. As discussed below, the processor may assign instruction operations to particular ALUs for execution by associating (e.g., inserting, linking) each instruction operation to a particular slot/column of the instruction word. When the instruction word is due to be executed, the entire row is read and the individual instruction operations of the row are executed by the corresponding ALUs. If any slot of an instruction word is unpopulated, then the ALU corresponding to that instruction slot does not receive any new instruction for that clock cycle and will either remain idle or continue with a prior multiple-clock cycle process that it is engaged in. In the alternative, slots that do not receive an instruction operation from the program could be assigned a dummy instruction operation for the ALU to either remain idle or continue with a prior multiple-clock cycle process that it is engaged in.

"Logically direct connection," "logically directly connected" and the like refers to a connection over a pathway that lacks intervening logic that would modify a signal passing over the connection. A non-limiting example is a wire connecting two different points. Another example is wires in combination with traffic direction components, such as a multiplexer or an operand selection switch. A buffer may also be part of a logically direct connection when it does not change the signal. A logically direct connection may pass through another component (e.g., an ALU) provided that the component does not exert a logic based modification on the signal.

"Normal operation" refers operations that occur while the support structure and software is operating in an undamaged state under ambient conditions. Operations that occur while the structure and software is physically or electrical damaged (e.g., a virus) or under external duress conditions (e.g., excessive heat, cold, pressure, water exposure) are to be considered abnormal.

The embodiments herein are discussed with respect to components at room temperatures, and without any specific effort to reduce the temperature. However the invention is not so limited, and the embodiments could be implemented in other temperature conditions.

Some embodiments herein are discussed with respect to processes and/or flowcharts. It should be understood that, for any process or flowchart discussed herein, there can be additional, fewer, or alternative steps, performed in similar or different orders, or in parallel, within the scope of the various embodiments, unless otherwise stated.

As discussed above, a paradigm of the prior art is to guarantee two events in a single clock cycle. First, an ALU will receive and select as inputs from whatever source within the data path that provides those inputs. Second, the ALU will perform a processing step on the received/selected input(s) where the processing step is known to take one cycle or less to complete.

According to an embodiment of the invention, a new paradigm is provided in which the guarantee is limited to completing an act of local communication to a consumer ALU, and the consumer ALU performs its assigned processing step. Thus there are two requirements to maintain the guarantee. First, like the prior art the ALU will perform a processing step on the received/selected input(s) where the processing step is known to take one cycle or less to complete. Second, an ALU will receive and select as inputs from whatever local producer within the data path provided them; unlike the prior art this paradigm does not require, and thus does not guarantee, that the ALU will receive and select as inputs content that is non-local.

This paradigm is different than the prior art in that the prior art requires that the clock speed allow the time needed for global communication across the entire data path, while some embodiments herein only require that the clock speed allow for the time needed for local communication; since the time for local communication is smaller than the time for global communication, the overall clock speed is faster. When a particular instruction operation requires a global communication, then the corresponding instruction operation is delayed by one or more clock cycles to allow for the global communication to be completed. This paradigm may be achieved in part by taking into account the location of ALUs assigned to specific steps, and performing related subsequent steps in ALUs that are local.

Figure 2A:
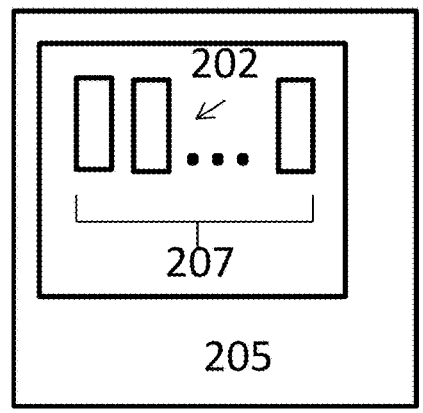
FIG. 2A is a block diagram of a prior art processor chip.

The above may be demonstrated in a basic example of two instruction operations for a processor 250 of FIGS. 2A and 2B to implement, hereinafter referred to as Instruction Set 1:

$$A=R1+R2 \qquad 1:$$

$$B=A+R3 \qquad 2:$$

where

R1, R2 and R3 are registers that provide a particular value as available within the data path.

Figure 2B:
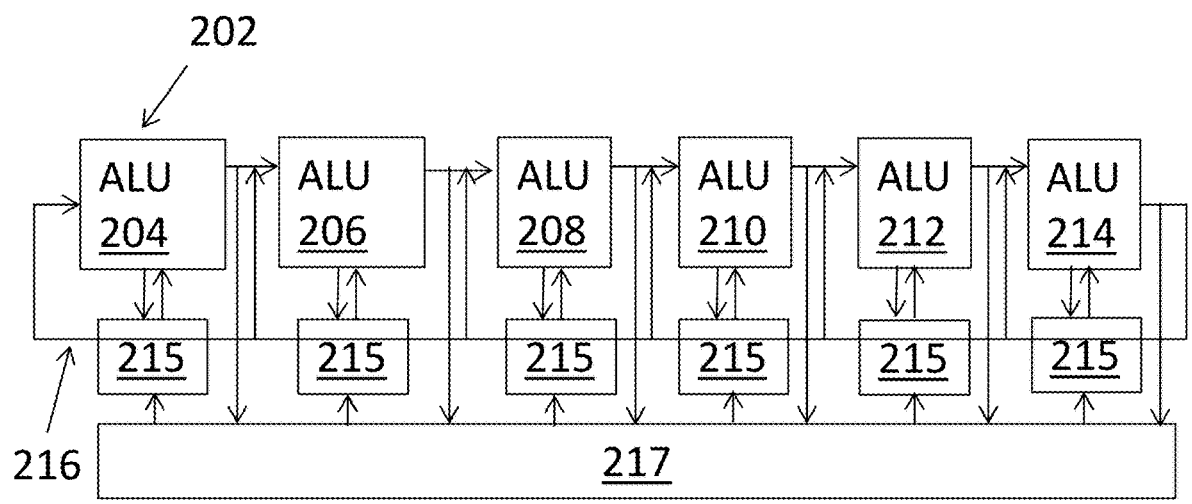
FIGS. 2B and 2C are block diagrams of a prior art ALU layout within a data path of a prior art chip.
Figure 2C:
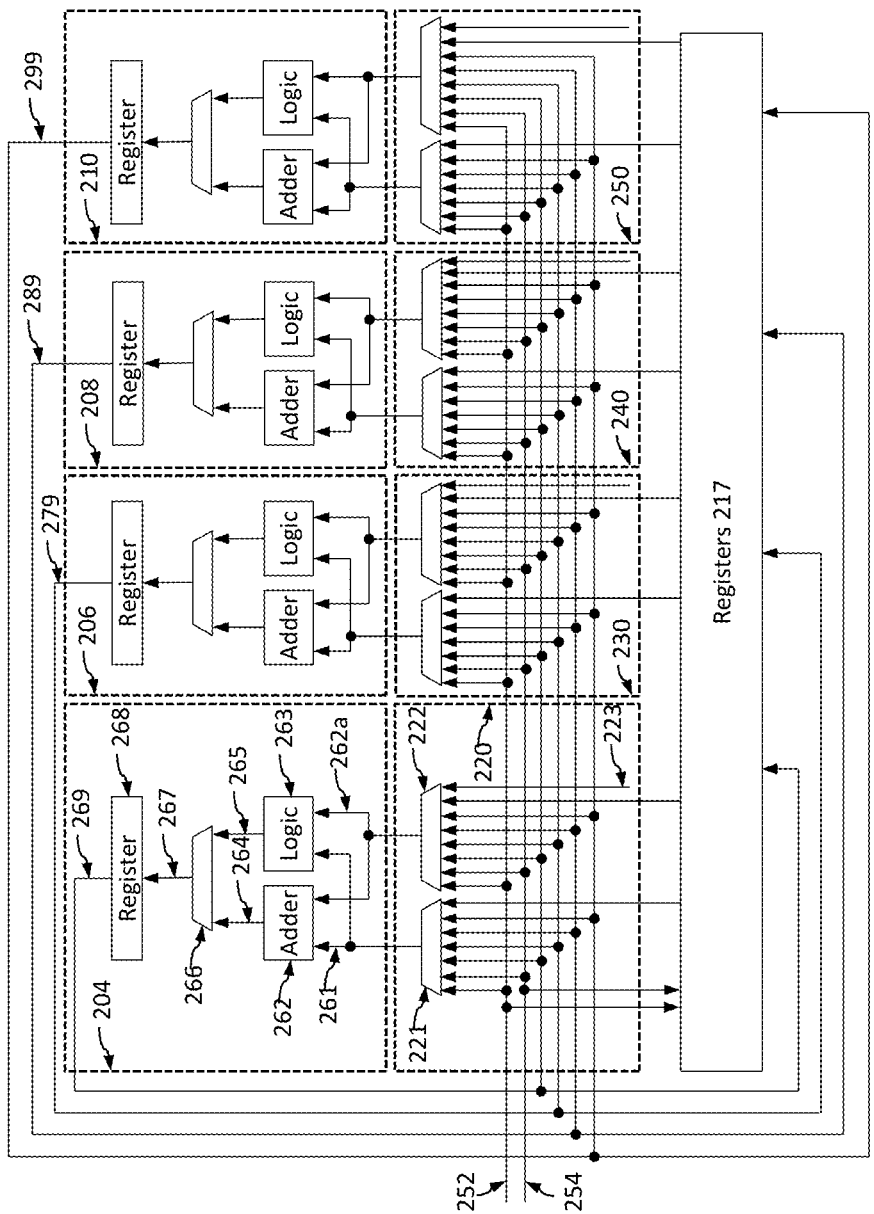

To execute Instruction Set 1 under the methodology of the prior art, processor 250 would select any ALU in FIG. 2B it wants for the first instruction operation A, such as for example ALU 208. The prior art processor must then also select a second ALU to perform the second instruction operation B. In selecting the second ALU, the prior art processor does not take into account the location of ALU 208 where the prior instruction operation A was executed. This is in part because the prior art paradigm is based on the clock speed allowing for the selection of any ALU within the data path to perform the second step; the distance between the ALUs is irrelevant and ALU location of prior instructions are thus not considered in selection of the second ALU. The prior art processor could thus just as easily pick ALU 210 (close to ALU 208) as ALU 214 (several ALUs distant). Similarly, the prior art processor does not leverage the dependent relationship between instruction operations A and B, in that instruction operation B depends on the outcome of instruction operation A.

Per an embodiment of the invention, a processor will likewise select a first ALU such as ALU 210 for instruction operation A. To assign the second ALU, the processor can take into account both the nature of the dependent relationship between instruction operations A and B and the location of the ALU where A is performed. Here, the processor recognizes that (a) ALU 210 performed the first instruction operation A and thus already has access to the outcome, and (b) that all of the information needed to execute instruction operation B is available locally to ALU 210. That is, instruction operation B needs the result of instruction operation A, which will be present on ALU 210 by virtue of completion of the first instruction operation A, and the value from register R3 (B=A+R3), which is locally accessible from the registers 217. The processor can thus assign one of the ALUs local to ALU 210 to perform the second instruction operation B.

As noted above, what is considered local is predefined. A non-limiting example of local communication is an ALU to itself, such as shown in FIG. 3B. In the architecture of FIG. 2B the "most" proximate consumer ALU to a producer ALU is itself, in that the shortest transmission path from one ALU to the next is between the input and output of a single ALU. For example, if local is defined as an ALU to itself, then with instruction operation A having been assigned to ALU 210, then instruction operation B (as both dependent to instruction operation A and executable locally), can also be assigned to ALU 210. Since the distance between the input and output of ALU 210 is relatively short, the corresponding delay from time of transmission is minimal (compared to global communication across the entire data path).

Another non-limiting example of a definition of local communication is any adjacent ALUs; for example under such a definition the ALU 210 executing instruction operation A is within that local range of adjacent ALUs 208 and 212. Communication by ALU 210 to ALU 208, 210 (i.e., to itself) or 212 would be local. Communication beyond one adjacent ALU (e.g., 204, 214) is considered global. If instruction operation A is assigned to ALU 210, then instruction operation B could thus be assigned to ALU 208, 210 or 212 under this definition of local. Instruction operation B would thus be assigned to ALU 204, 206 or 214 under this definition of local, as those ALUs are too far away from ALU 210 to guarantee that ALU 201 would receive their outputs and perform instruction operation B within a single clock cycle.

The definition of local also preferably includes the range to the operand selection units and registers that provide the input to the ALUs, such as 2255 and 2355 in FIGS. 22 and 23, described below.

In the above examples, the processor and corresponding methodology applied "location awareness" in the selection of the ALU for instruction operation B, in that the processor knew the location of the producer ALU that would execute the prior instruction operation A and used that location as a factor in deciding the location of the consumer ALU that would perform the second instruction operation B. As discussed in more detail below, the processor may actively seek to assign instructions to ALUs to avoid non-local communication.

The above paradigm allows for a CPU to operate with significantly faster clock speed than the prior art because the "worst case" time of transmission is established by local communication rather than global communication. The distance for local communication (e.g., between a range of two adjacent ALUs) is considerably smaller than the distance for global communication from the extreme edges of ALUs in the data path. Since the corresponding distance is so small, the corresponding time of transmission for local communication is also quite small compared to the time of transmission for global communication.

By way of comparison, as discussed above in the prior art the clock cycle may be defined by the following equation:

Minimum clock cycle time=$t$maxglobalcomm+$t$max$op$+$toh$

In an embodiment of the invention, the clock cycle would be defined by:

Minimum clock cycle time=$t$maxlocal+$t$max$op$+$toh$ where tmaxlocal is the maximum amount of time for an ALU to receive and select inputs from a local producer;

tmaxop (as discussed above) is the maximum amount of time that one ALU would take to complete a step within a single clock cycle; and toh (as discussed above) is the time allocated to "overhead" parameters as are known in the art, including but not limited to one or more of clock skew and clock jitter, variation of process, temperature or voltage, ground bounce, simultaneous switching, signal integrity, Miller effect, guard band and/or aging.

As discussed above, non-limiting examples of tmaxglobalcomm, tmaxop, toh are 120 ps, 120 ps, and 20 ps, with a corresponding clock cycle of 260 ps and a minimum clock speed of 3.85 Ghz. For that same example and circuit conditions, an approximate value of local communication (where local is defined by an adjacent ALU) may be tmaxlocal=20 ps. The corresponding clock cycle time and clock speed art between the prior art and the instant embodiment is thus:

TABLE 1

|  | Prior Art | Instant embodiment |
| --- | --- | --- |
| Minimum clock cycle time | tmaxglobalcomm + tmaxop + toh 260 ps = 120 + 120 + 20 | tmaxlocal + tmaxop + toh 160 ps = 20 + 120 + 20 |
| Maximum clock speed | 1/260 ps 3.85 Ghz | 1/160 ps 6.25 Ghz |

The clock speed of the instant embodiment through the application of local communication is thus some 60% faster than the prior art. This is because the prior art speed is based on tmaxglobalcomm whereas in the above embodiment speed is based on tmaxlocal where tmaxlocal<<tmaxglobalcomm.

Even greater improvements are potentially available, via scaling in improvement of clock speed with faster transistors. As discussed above, in the prior art, further improvements in transistor speed yield little improvement in clock speed because time of processing became a negligible factor compared to tmaxglobalcomm, but this is not the case with some embodiments herein due to the reliance on the much smaller tmaxlocal. For example, applying the above equations with a potential future doubling of transistor speed (tmaxop=60 s) and keeping other factors stable for sake of example, the clock speeds are as follows:

TABLE 2

|  | Prior Art | Instant embodiment |
| --- | --- | --- |
| Minimum clock cycle time | tmaxglobalcomm + tmaxop + toh 200 ps = 120 + 60 + 20 | tmaxlocal + tmaxop + toh 100 ps = 20 + 60 + 20 |
| Maximum clock speed | 5 Ghz | 10 Ghz |

In the above example, the prior art paradigm only saw about 1.25 Ghz (+30%) improvement in clock speed from Table 1 to Table 2 in response to the doubling of the transistor speed. In contrast, the paradigm of the instant embodiment set forth herein saw a 3.75 Ghz improvement (+60%) in clock speed from Table 1 to Table 2. Overall, the clock speed of the instant embodiment in this example would be twice that of the prior art paradigm.

Figure 4:
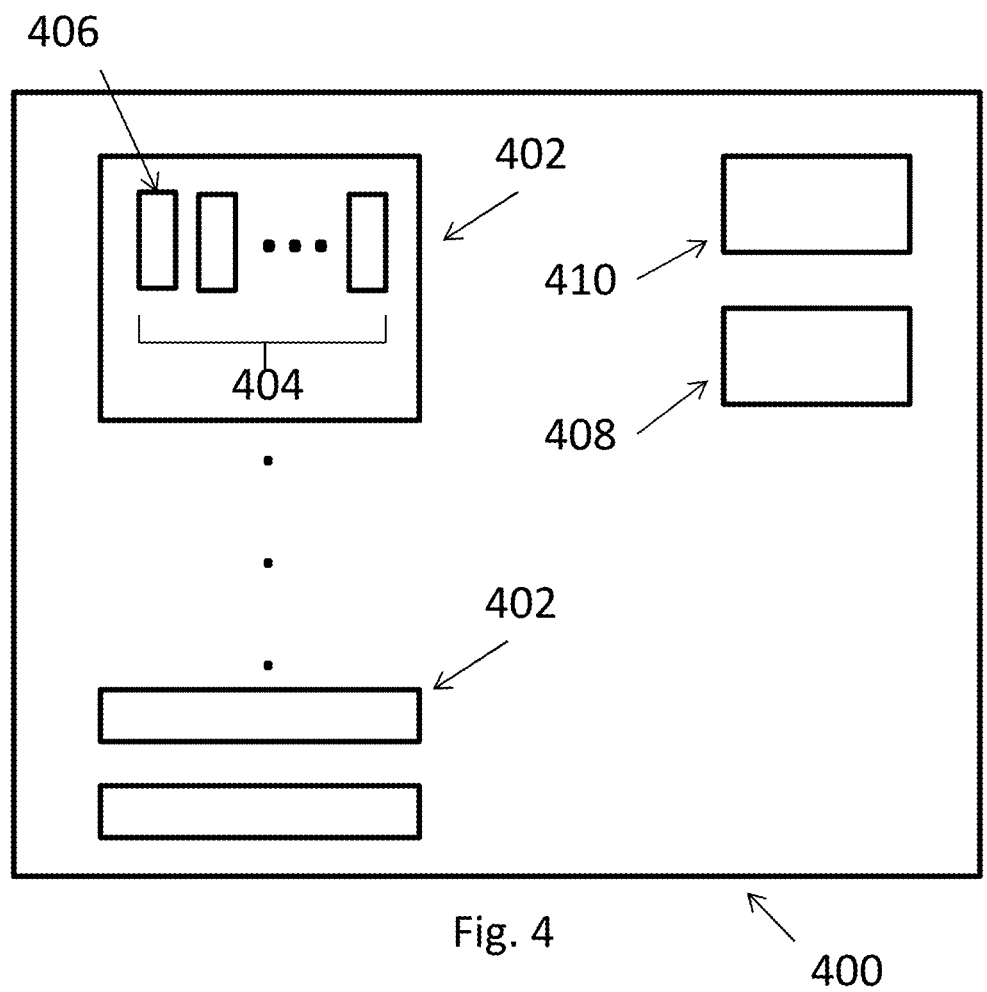
FIG. 4 shows a processor chip according to an embodiment of the invention.

A representation of a processor chip 400 which can practice the paradigms discussed herein is shown in FIG. 4. Processor chip 400 includes one more cores 402, each core having a data path 404 with multiple ALUs 406. Compiler functionality is provided by a compiler as software resident on appropriate hardware as is known in the art, and represented in FIG. 4 as compiler 408 running on processor chip 400. A scheduler 410 will implement the compiled instructions on the ALUs. Processor 400 has a clock cycle and corresponding clock speed consistent with that described above, in that it guarantees local communication but not global communication. The invention is not limited to this particular chip layout, and other layouts could be used, and the various operations distributed as appropriate within those layouts.

As discussed above, the improved clock speeds are based on the guarantee that an ALU will receive and select as inputs from whatever local producer provided them. However, inevitably not every instruction can be performed locally, in that for whatever reason a particular consumer ALU needs a result from a non-local producer. A single clock cycle as set for local communication does not provide enough time to guarantee that the input from a non-local producer will arrive at the consumer ALU in time to allow for processing.

Some embodiments of the instant invention may compensate for this by delaying processing by the consumer ALU for as a many clock cycles as needed until the input has enough time to reach the consumer ALU. Thus, where the prior art processor used a single clock cycle for the global communication and the processing, a processor of the instant embodiment uses multiple separate clock cycles—at least one for the non-local communication and at least one for the processing once the inputs are received.

This can be illustrated with respect to Instruction Set 2, which includes five instruction operations:

$A=R1+R2$               1:

$B=A+R3$               2:

$D=R5+R6$               3:

$E=D+R7$               4:

$F=B+E$               5:

In the foregoing example, instruction operations A and B are in a dependent relationship, and each can be performed at a local level (e.g., by ALU 208 alone if that was the definition of local), within a single clock cycle. Instruction operations D and E are also in a dependent relationship, and each can be performed locally at a different ALU, (e.g. ALU 214). Thus four of the five instructions of Instruction Set 2 can be performed within local ALUs, all within a range of local communication.

This is not the case for instruction operation F. Since instruction operation F is dependent upon the outcomes of instruction operations B and E, in theory instruction operation F could be processed locally where A-B occurs, locally where D-E occurs, or at a new ALU entirely (e.g., ALU 212). However, execution of instruction operations B and E occur at ALUs too far apart to guarantee that the result of both instruction operations B and E could reach the corresponding ALU assigned to instruction operation F to process instruction operation F within the same clock cycle.

For example, if instruction operation F were performed in the same locality as instruction operations A-B (ALU 208), then the result of instruction operation B is locally available, but the result of instruction operation E (from ALU 214) is not. Execution of instruction operation F thus requires a non-local communication. As discussed above, the clock cycle is not long enough to guarantee non-local communication, in that the clock cycle is not long enough to guarantee that the result of instruction operation E will reach ALU 208 from ALU 214 in time to be processed.

To account for this need for an instance of non-local communication, processer 400 may insert an additional instruction into Instruction Set 2, which is a delay instruction in which the execution of instruction operation F is delayed by one clock cycle. The processor will thus assign the ALUs as a schedule of six instruction operations, rather than five:

$A=R1+R2$     1:

$B=A+R3$     2:

$D=R5+R6$     3:

$E=D+R7$     4:

WAIT(bubble)     5:

$F=B+E$     6:

The addition of the inserted instruction operation provides an additional clock cycle of time for the result of instruction operations E and/or B to travel globally to reach a destination ALU. For example, using the metrics as discussed above with respect to Tables 1, the maximum time needed to get from one ALU to another in the data path is about 120 ps. A single clock cycle of the processor is 160 ps. Since the clock cycle of 160 ps is more than the maximum travel time of 120 ps, waiting to execute instruction operation F by one clock cycle will guarantee that the results of instruction operations E and B will have enough time to reach the consuming ALU to process instruction operation F. If for some reason it was not enough time (e.g., the maximum travel time was longer than the clock cycle), then an additional delay step(s) could be inserted until enough time was provided.

Despite the additional clock cycle, the entire process occurs faster than the prior art. In the prior art processor using the metrics discussed above in Table 1, the above five steps 1-5 would be executed on 3.85 Ghz processor at 260 ps per step, for a total of 1300 ps to execute the five instruction operations. In the processor of the above embodiment, the six instruction operations (five of the original plus one delay step) would be executed on 6.25 Ghz processor at 160 ps per step, for a total of 960 ps. The processor of the instant embodiment executes the overall instruction operation set A-F at higher clock speed (+62%) and in less time (−26%) than the prior art paradigm.

As seen in the above examples, the higher clock speed is at least in part offset by the increase in the number of steps to account for non-local communication. Applicants estimate that by using prior art ALU architectures some 85+% of instruction operations can be conducted locally (based on what the specific definition of local is). Assuming worst case of one delay needed for every six substantive instructions operations (i.e., 83% local, 17% global), processor 400 would still have a higher clock speed (+65%) and execute the same instruction operation set in less time (−30%) than the prior art paradigm. Other embodiments as discussed herein below may further improve on this. The overall result is processor with a faster clock speed and faster performance of the instruction operations.

Factors that affect the balance of what operations can be performed locally as opposed to those that require non-local transmission of data include the scope of local as opposed to the percentage of global. Specifically, the smaller the local range is, the smaller the time of transmission and thus the faster the clock speed. However, a smaller range of local processing may increase the percentage/number of global steps because less steps can meet that tighter definition for local processing.

For example, setting locality to just an ALU itself (e.g., FIG. 3B) is a shorter distance than an adjacent ALU; this minimizes the time of transmission and correspondingly maximizes clock speed such that approximately 90% of instructions could be executed as local under this definition using prior art ALUs. In another example, setting locality to adjacent ALUs (e.g., 302 or 304) has a longer time of transmission compared to the ALU-to-itself and thus the time of transmission is higher and clock speed is slightly lower. However, Applicants expect that approximately 93% of instructions could be executed as local under this definition using prior art ALUs and require less delays for global communication.

Various embodiments herein can further improve on the above. One such embodiment, disclosed in more detail below, is to collect and simultaneously execute instruction operations that can be performed in parallel, thus reducing the number of clock cycles needed to execute the instruction set. For example, Instruction Set 1 above has two instruction operations, but they can be performed in parallel in one clock cycle.

Figures 5A, 5B:
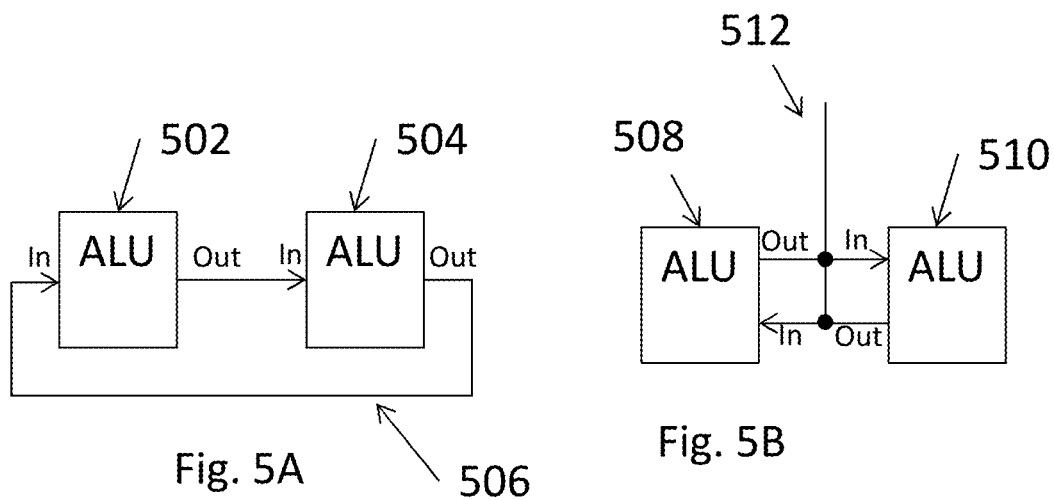
FIG. 5A is a prior art arrangement of a pair of ALUs.
FIG. 5B is an embodiment of an arrangement of a pair of ALUs.

Another such embodiment is to utilize ALUs with different configurations and/or layouts. Specifically, as shown in FIG. 5A, an ALU configuration has the input and output on opposing sides of the ALUs, such as ALUs 502 and 504, connected by a pathway 506. If local is defined as being an adjacent ALU, then the time of transmission is dictated by the longest pathway for the data to travel, in this case the output of 504 back to 502 along pathway 506.

FIG. 5B shows an embodiment of an ALU configuration referred to herein as "mirrored" ALUs. In this configuration each of ALUs 508 and 510 have both input and output on the same side, both connected to pathway 512. Further, the ALUs 508 and 510 are paired with one flipped relative to the other, such that the I/O connections face each other with an intervening pathway 514, and may directly connect to each other. If local is defined by an adjacent ALU, then the time of transmission is dictated by the longest path, in this case the output of 508 back to 510 along pathway 512. Thus both FIGS. 5A and 5B have the same definition of local (i.e. an adjacent ALU) but since pathway 512 in FIG. 5B is shorter than pathway 506 in FIG. 5A, the time of transmission is lower for FIG. 5B and can support a correspondingly higher clock speed.

Defining local as a mirrored ALU pair such as in FIG. 5B combines advantages of an adjacent ALU pair (which may reduce the number of global instructions compared to a ALU-by-itself) with distances that are even shorter than ALU-by-itself (the distance between ALUs 508 and 510 potentially being even shorter than the output to input path shown in FIG. 3B for ALU 214).

Figure 6:
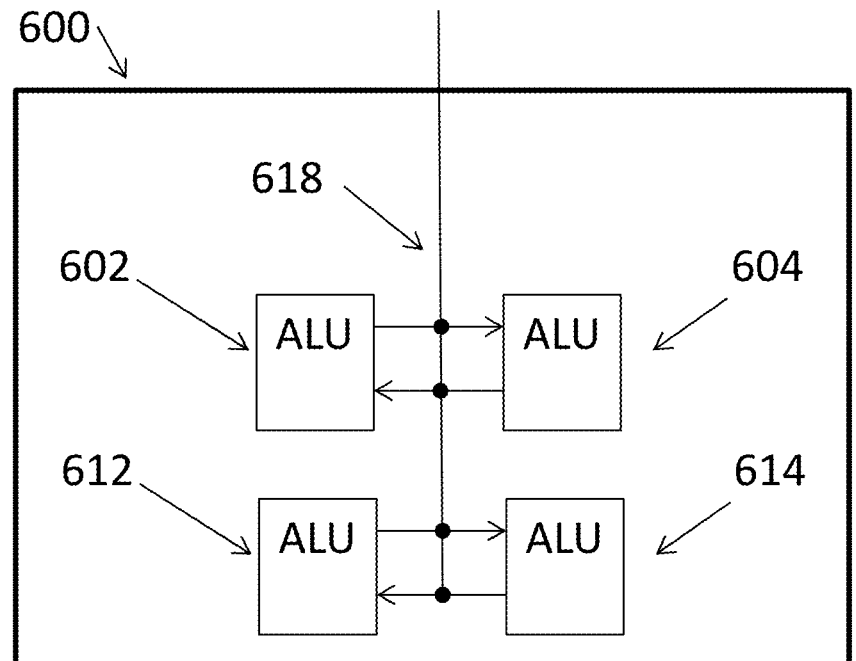
FIG. 6 is an embodiment of an arrangement of ALUs in a data path.

FIG. 6 shows a core 600 of processor chip 400 with two pairs of mirrored ALUs 602-604 and 614-616. In this embodiment, local could be defined as mirrored pairs, i.e., 602-604 are local to each other and 612-614 are local to each other. Pathway 618 allows for global ALU communications, locally provided values (e.g., via operand selection units and registers), and other data and commands as needed.

Applying Instruction Set 1 (A=R1+R2, B=A+R3) to the configuration of FIG. 6 with local defined as a mirrored ALU pair, processor 400 under certain conditions could assign instruction operation A to ALU 602, and seeking to keep instruction operation B within local range it would assign instruction operation B to ALU 604, but not to 612 and 614 as these ALUs are outside of the range of local with respect to ALU 602.

Assignment of ALUs via location awareness may be implemented by a compiler 408 of the processor chip 400. The compiler 408 may be a standard compiler modified with specific programming to perform the mapping of steps to ALUs, or may be custom designed. For brevity, the embodiments below are described with respect to various operations performed by processor chip 400, although it is to be understood that the invention is not so limited.

Figure 7A:
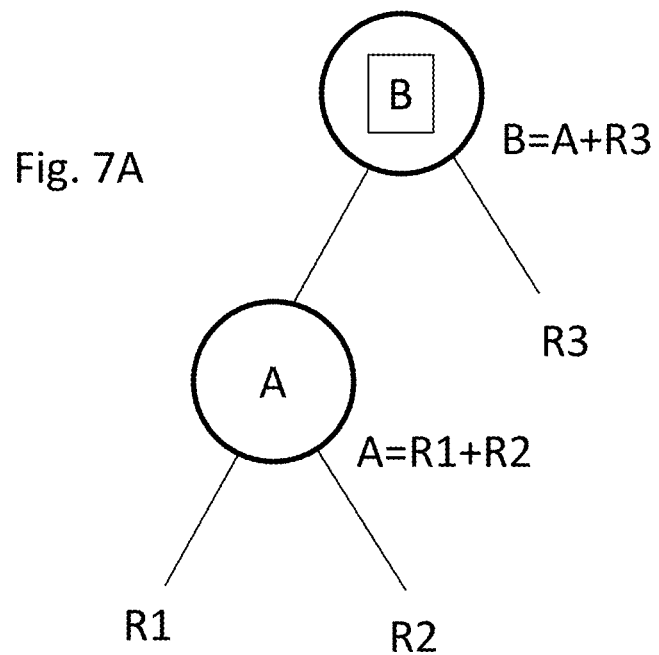
FIGS. 7A-7E are dependency graphs.

During the above, the compiler 408 generates a dependency graph of nodes corresponding to instruction operation based on the dependencies of the operations that ultimately will form the end set of instructions. FIG. 7A shows a dependency graph for Instruction Set 1, in which node is one instruction operation. Instruction operation A=R1+R2 may be thought of as "independent" because it does not rely upon the outcome of any prior operations (R1 and R2 are locally present from the registers). Instruction operation B=A+R3 is "dependent" because it relies upon the outcome of A.

As is known in the art, compilers will attempt to reduce the number of instruction operations to be performed by applying underlying rules and examining a resulting score under those rules. The process is iterative, and can execute over 100 passes attempting to optimize the allocation of steps within the dependency graph. The dependency graph may thus continue to change over these passes. At some point, the compiler will map the nodes on the graph to specific ALUs for execution; this may occur at least twice, once before the registers are assigned and once after the registers are assigned.

An embodiment of the invention may utilize at least some of the rules that are applied by prior art compilers. The embodiment would also apply specific rules for ALU selection based on location awareness. Non-limiting examples of such rules are that each operation is performed locally when possible to avoid non-local communication, and the number of non-local communications should be minimized.

Once the dependency graph of the compiler reaches a particular state of evolution, the system will begin assignment of ALUs to nodes within the dependency graph into instruction words. Each instruction word explicitly specifies instructions to assign to the individual ALUs to execute at the same time, concurrently, in parallel, during a common clock cycle. Unlike VLIW words, the instruction word of the instant embodiment can include some instruction operations with direct independencies. Depending upon circumstances at least one level of interdependency of certain instruction operations can be accommodated, and potentially two or more if the ALUs are designed to handle that many inputs.

Figure 10A:
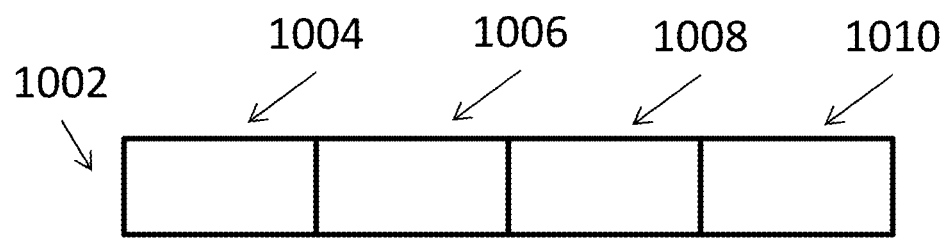
FIGS. 10A and 10B are block diagrams of an embodiment of instruction words.

FIG. 10A shows an embodiment of an instruction word 1002 as a mapped instruction word of a row with slots within columns 1004, 1006, 1008, and 1010 for which the slots are associated with specific ALUs; the number of slots may be the same as the number of ALUs within data path 404, but this need not be the case as discussed below.

Figure 10B:
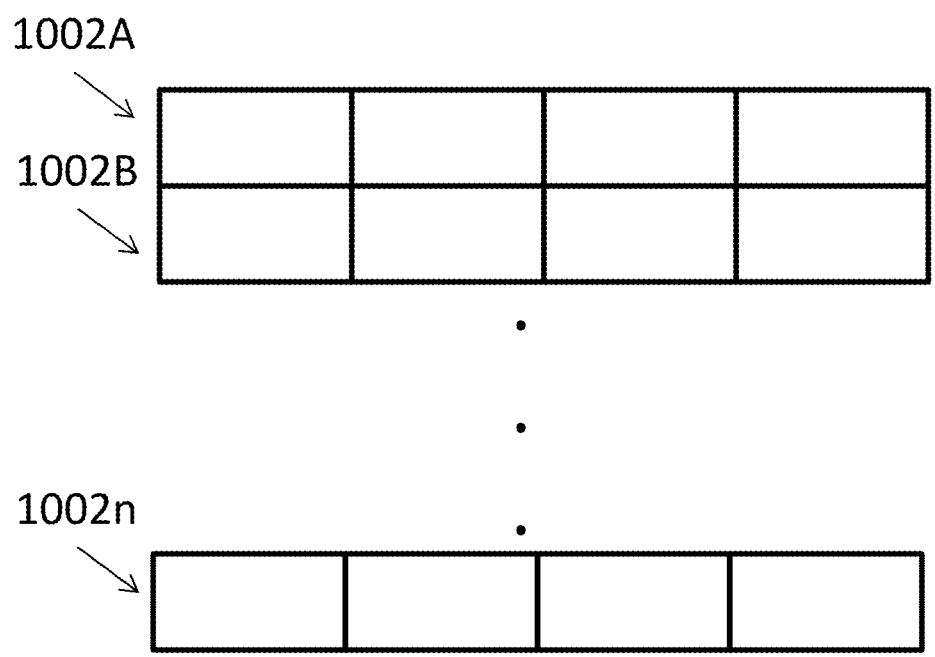

FIG. 10B shows multiple sequential instruction words 1002A-1002n, for which the slots form columns, and for which when populated by instruction operations the instruction words 1002A-n collectively define a map of instruction operations. Each row represents the instruction operations that will be executed concurrently by the ALUs in a corresponding clock cycle. Each column of slots is specific to a particular ALU within the data path, and thus the column represents the sequence by which that ALU will perform instruction operations. For example, with respect to the four ALU data path configuration of FIG. 6, ALU 602 could be assigned to column 1004, ALU 604 could be assigned to ALU 1006, ALU 612 could be assigned to column 1008, and ALU 614 could be assigned to ALU 1010. Thus, assignment of instruction operations to an ALU could encompass entering that instruction operation into the appropriate column/slot as dedicated to that ALU. However, the invention is not so limited, and columns/slot may not be allocated to specific ALUs, with instead the content of the slot having an identifier to the particular ALU.

As discussed in more detail below, processor 400 will work through a dependency graph to assign each of the instruction operations to a particular ALU 406 within processor chip 400 for execution. The processes identifies a subset of instruction operations, including in some case directly dependent instruction operations, that can be performed in parallel by the ALUs during the same clock cycle and assign them to those ALUs.

Figure 8:
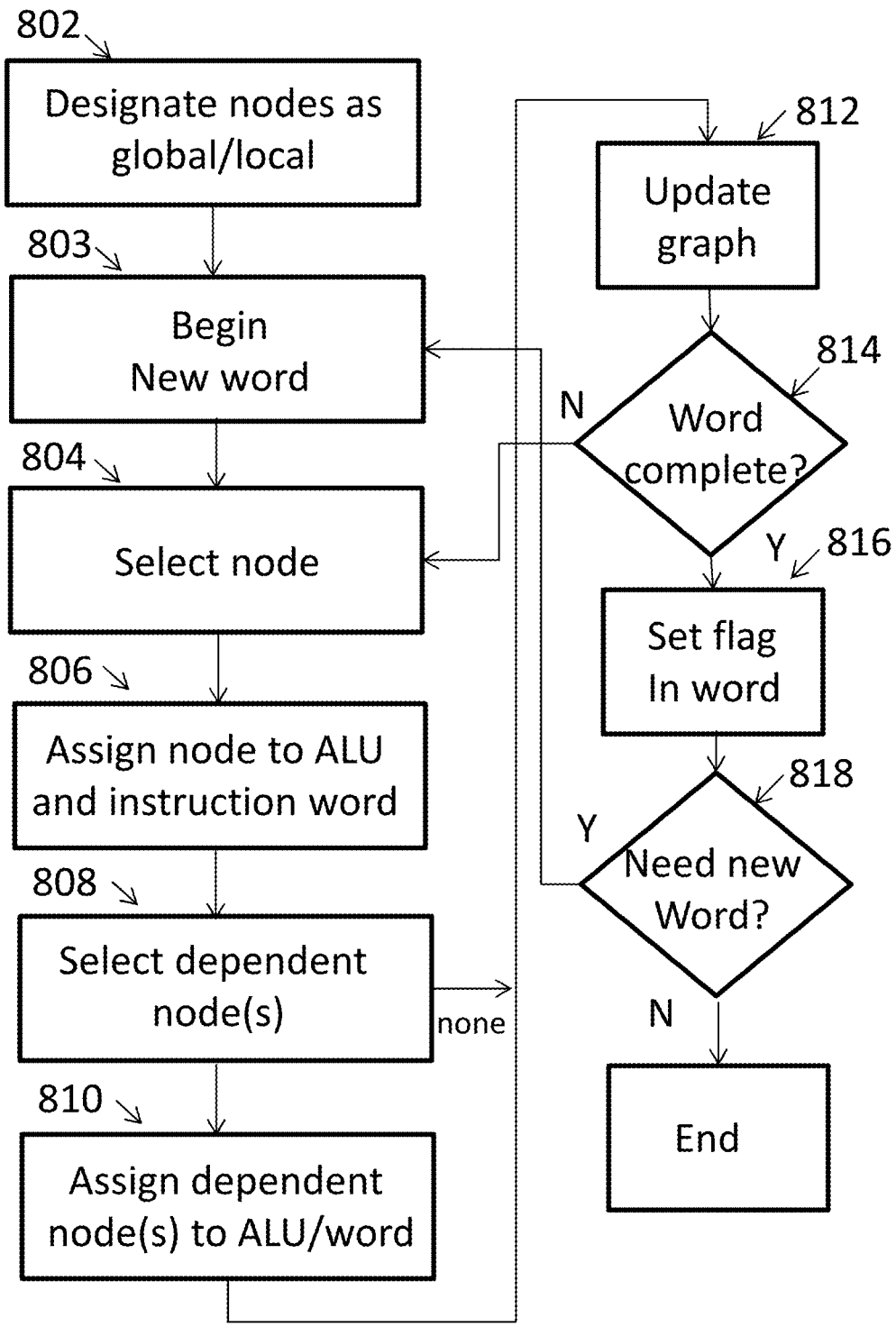
FIG. 8 is a flowchart of an embodiment of the invention for assigning instruction operations to ALUs.

Referring now to FIG. 8, an embodiment of a methodology for assigning ALUs through location awareness is shown in connection with a flowchart 800. The flowchart can be applied to any program, for any data path of a core within a particular processor 400 with an ALU layout for which local communication is defined. The steps of the flowchart are preferably carried out by the compiler 408 running on the processor 400, but as other components of the processor 400 may be involved in the process, the discussion herein will attribute the functionality generally to processor 400.

At block 802, the processor 400 preliminarily designates the individual instruction operations of the dependency graph as global or local, based on whether or not the nature of the operation performed at the node can be completed locally or requires a global communication (per the definition of local). For example, an instructions node that is based on inputs from local registers only is likely local because register content is locally available. An instruction node that is based on inputs from two different local or global instruction nodes will likely be global. An instruction node that is based on one input from a local or global instruction nodes either alone or in combination with register inputs will likely be local.

In some cases the graph will not be able to predict whether the instruction operation of a particular node will be global or local. This may occur for example at the boundaries of the dependency graph where it is unclear what the preceding step might be (e.g., the preceding step might be part of another program that is not even entered in the system yet). In such cases, since the processor 400 does not know what occurs past the boundary, the compiler may consider such operations to be local and allow subsequent processing to make adjustments as necessary. In the alternative, the compiler may consider such operations to be global and allow subsequent processing to make adjustments as necessary.

The efforts at block 802 to assess local and global need not be entirely accurate. As discussed below, errors in assignments may be corrected and/or compensated for in subsequent processing. The designation of local and global at block 802 may therefore be considered preliminary.

After the designation of local/global nodes, processor 400 will at block 803 begin with a new instruction word 1002, preferably in mapped instruction format. This may entail creating a new instruction word (to follow any prior instruction words), or identifying a previously created instruction word. In an alternative embodiment, in which instruction operations are collected rather than mapped, block 803 may be unnecessary.

At block 804 the processor 400 selects a node from the remaining portion of the dependency graph for assignment, where the remaining portion excludes assignment consideration for any previously assigned nodes. (For the initially selected node the entire graph is present, as nothing has yet been assigned.) The selected node may be the lowest node on the remaining critical path (i.e., the path within the dependency graph with the longest number of steps between beginning and completion) that does not violate a rule.

Figure 9:
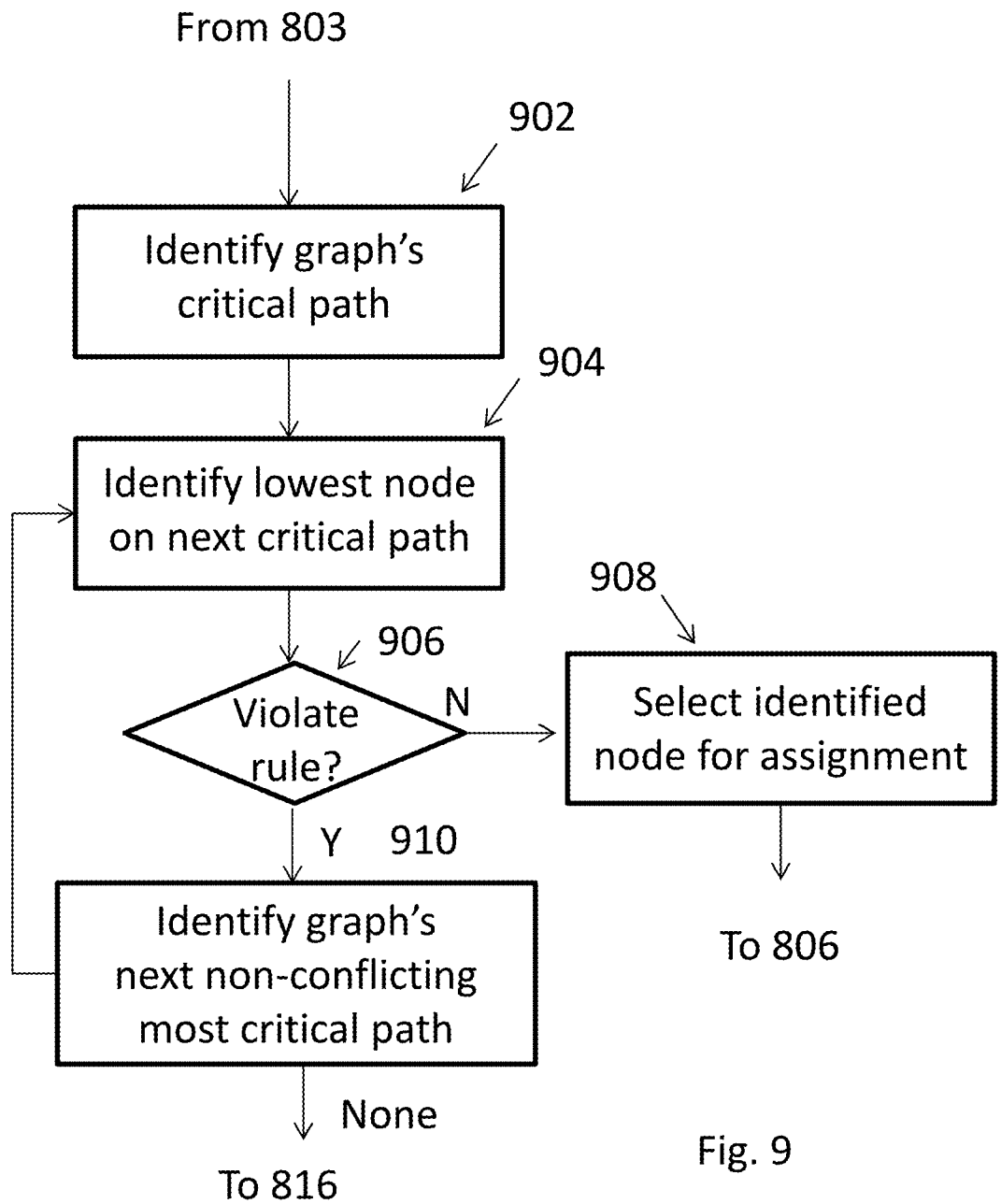
FIG. 9 is a flowchart of an embodiment of node selection block from FIG. 8.

FIG. 9 shows a flowchart of a non-limiting methodology by which block 804 may be executed. At block 902, processor 400 identifies the critical path of the distribution graph; since each node may include multiple steps, the critical path may be different than defined by the longest number of nodes. At block 904, processor 400 identifies the lowest node of the critical path identified at block 902. At block 906 processer 400 determines whether selection of the instruction operation of the identified node would violate any rule, e.g., if the inclusion of the instruction operation in the particular instruction word would create a situation in which the guarantee of local communication and processing could not be maintained. If no rule is violated then at block 908 processor 400 selects that node for assignment and control passes to block 806 in FIG. 8.

If inclusion of the instruction operation would violate a rule at block 906, then at block 910 processor 400 identifies the next most critical path and returns control to block 904. This process may continue iteratively until a node is selected. Ultimately if no node meets the criteria (e.g., all nodes exhausted, some nodes remain but enough nodes have been considered that further searching would be considered counterproductive or futile), then control will pass to block 816 to being the process to transition to a new instruction word (discussed below).

At block 806 processor 400 selects an ALU for the instruction operation of the assigned node and associates the instruction operation with a slot of the instruction word 1002. Various rules may define which ALU and/or slot to select. For example, an ALU that is already in use is unavailable and should not be assigned. Processor 400 may not want to use an ALU that is local to an ALU already in use to avoid potential conflict in allocation of local resources unless it makes sense to do so.

As discussed above, when in a mapped instruction word, format slots of the instruction word 1002 may be dedicated to certain ALUs, and thus the instruction operation-ALU association may be defined by inserting the instruction operation into the appropriate slot of instruction word 1002 for the selected ALU. However, the invention is not so limited, in that there are other ways to create the association that may or may not involve use of mapped instruction words. By way of non-limiting example, a marker could be inserted into the instruction word pointing toward the instruction operation as stored elsewhere. By way of another non limiting example, the instruction operation could be inserted into the instruction word along with a marker to the selected ALU. The invention is not limited to the form of the association or the collection of the instruction operations into the instruction word.

At block 808, processor 400 identifies any nodes dependent upon the previously assigned node that can be included in the same instruction word 1002 for parallel execution. The following non-limiting rules may apply to whether a particular dependent node may be included in the same instruction word 1002 as the nodes from which it depends. For example, one rule may be that the dependent node is local (per block 804). Another rule may be that the instruction operations of the dependent node and the node from which it depends are simple/fast enough that both can be completed within a single clock cycle. Another rule may be that the level of dependency does not exceed what the ALUs can handle (e.g., one level of dependency when ALUs can only process two inputs). Another rule may be that the instruction word 1002 has room for the dependent node (i.e., the instruction word is not already full). Another rule may be that a local ALU is available. The invention is not limited to the rules that may be applied.

If such a rule complaint node is identified, then control passes to block 810. If no such node is identified, then control passes to block 812.

At block 810, processor 400 assigns any identified dependent node instruction operation from block 808 with an ALU and the instruction word 1002. For a mapped instruction word, the ALU assignment may be inserting the identified instruction operation into a slot of the instruction word that corresponds to the ALU that is local relative to ALU of the producer node upon which the dependent node is dependent. Other forms of assignment may be used as discussed herein.

At block 812, processor 400 updates the dependency graph to remove assigned nodes from further consideration in node selection (at least from a critical path perspective), this may be a deletion from the dependency graph itself, or a marker over the node that the node should no longer be considered. The invention is not limited to the manner in which the methodology removes assigned nodes from further assignment consideration.

At block 814, processor 400 determines whether the instruction word 1002 is complete and should be closed. Non-limiting examples of reasons instruction word 1002 may be considered complete are when the instruction word is full (there are no more available slots), there are no instruction operations left to place (the dependency graph has been completely converted to instruction words), and/or there are slots available in instructions word 1002 but none of the remaining instruction operations can fit therein because its inclusion in the instruction word 1002 would violate a rule.

If the instruction word 1002 is complete, then at block 816 processor 400 sets a flag in the last instruction operation in the instruction word 1002 to indicate the end of instruction word 1002. Control passes to block 818 to check whether to begin a new instruction word 1002 for any remaining unassigned instructions operations. If so, control returns to block 803 to begin a new instruction word 1002. If not, the ALU assignment process ends.

Examples of application of the above flowchart will now be discussed.

Example 1

Figure 11A:
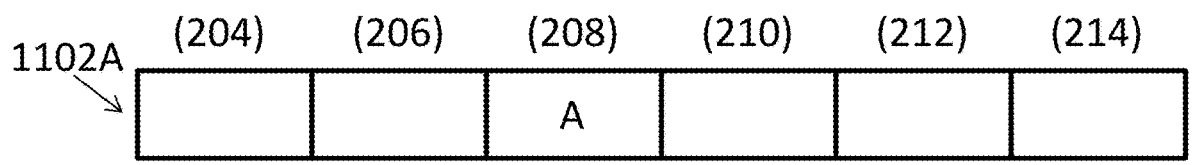
FIGS. 11A-11E are block diagrams of instructions words populated according to an embodiment of the invention.

In example 1, the prior art ALU configuration of FIG. 2B is used, and the definition of local is an ALU to itself (as shown in FIG. 3B). Six ALUs are present in FIG. 2B, and as shown in FIG. 11A each instruction word 1102 in mapped instruction word format includes six slots, specifically assigned to each of the ALUs 204-214. Instruction Set 1 is the program to be assigned to ALUs with the instruction operations A=R1+R2 and B=A+R3. As discussed above, the distribution graph of Instruction Set 1 is in FIG. 7A; in this graph example, each of the instruction operations of Instruction Set 1 occupies a single node, although it is to be understood that as this may not be the case, for as nodes are compiled, several instruction operations may occur within a single node, or several instructions operations may be complied into other instruction operations for the node. In this context, an instruction operation is assigned to a node, and instruction operation and node can be used somewhat interchangeably.

In the graph of FIG. 7A there are no global operations, and as such, at block 802 processor 400 designates each node as local. At block 892 processor 400 begins a new instruction word, in this case word 1102A. At block 804 and 806, processor 400 identifies A=R1+R2 as the critical path and inclusion of instruction operation A in instruction word 1102A does not (in this case) violate any rule; processor thus assigns instruction operation A to an ALU slot (e.g., ALU 208 for this example) in instruction word 1102A as shown in FIG. 11A.

At blocks 808 and 810, processor 400 identifies instruction operation B as dependent upon instruction operation A (B=A+R3), local to A, and the instruction word is not full (there are still three slots left). However, as locality in this definition is an ALU local to itself, instruction operation B cannot be assigned to another ALU in the same instruction word 1102A because the ALU for instruction operation A is already in use, i.e., there is no local ALU available in instruction word 1102A, for which to assign instruction operation B.

Figure 7B:
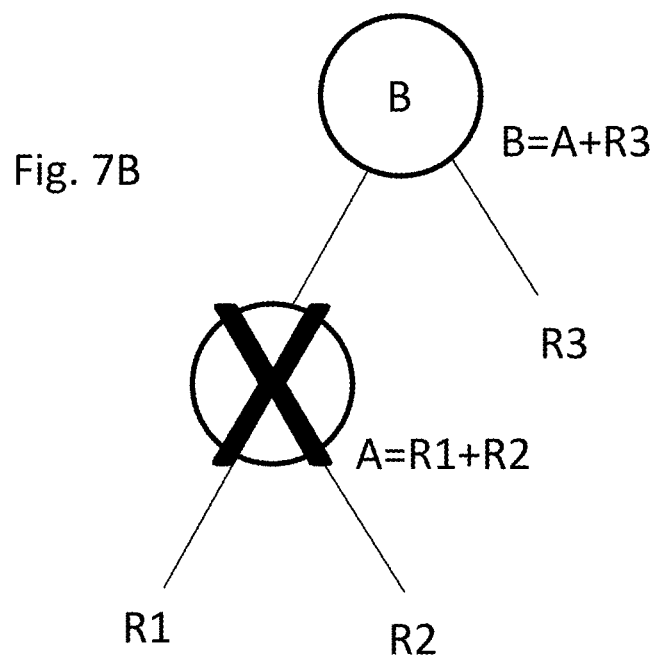

Since no other dependent node is available to populate instruction word 1102A, control passes to block 812, where processor 400 updates the dependency graph to remove node A from further assignment consideration as shown in FIG. 7B.

At block 814, the instruction word 1102A is considered complete. Even though slots remain for unassigned ALUs in instruction word 1102A, inclusion of the remaining node B would be a rule violation. A flag is thus set at block 814 to designate the slot for ALU 208 as the end of instruction word 1102A, a new word is needed and created at 803 as instruction word 1102B in FIG. 11B, and control returns to block 804.

Figure 11B:
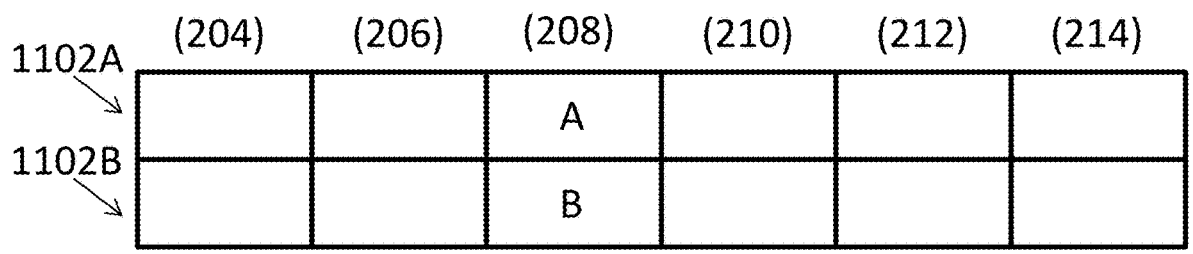

At blocks 804 and 806, compiler identifies B=A+R3 as the next critical path in the dependency graph (it is all that is left), and instruction operation B does not (in this case) violate any rule that would preclude inclusion in instruction word 1102B. Since instruction operation B is local to instruction operation A, processor 400 assigns instruction operation B to an ALU that is local to the ALU to which instruction operation A was assigned. In this case by the definition of locality (ALU to itself) ALU 208 would be used as it was the same ALU 208 for the predecessor instruction (i.e. operation A) as shown in FIG. 11B. (If for any reason ALU 208 was not available, then instruction operation B could not be placed in instruction word 1102B because the other ALUs are not local and a global communication would be needed, and a new instruction word 1102C (not shown) would need to be created.)

No further dependent nodes are selected or assigned at blocks 808 and 810 (none remain), the word is determined as full at block 812 (all nodes assigned), the flag is set at block 814 to designate the slot for ALU 208 as the end of instruction word 1102B, the process is determined as complete and 816 and the process ends.

Figure 11C:
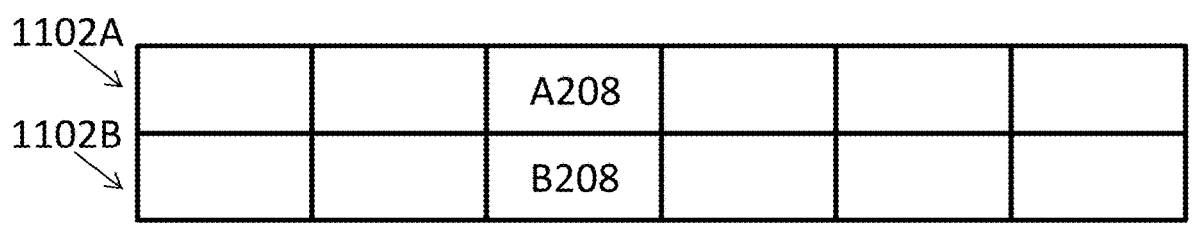

In the above example, the format of the instruction word as a mapped instruction word identifies the instruction operation-ALU association directly via the slot assignment. However, the invention is not so limited. FIG. 11C shows a non-limiting example of another representation of the populated instruction words 1102A/B that contains ALU IDs within the slots.

Figure 11D:
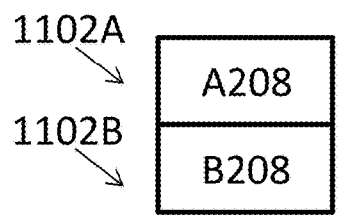

FIG. 11D shows a non-limiting example of another representation of the populated instruction words 1102A/B, which are not in mapped instruction format and for which instruction operation-ALU association is self-contained in a data field.

Figure 11E:
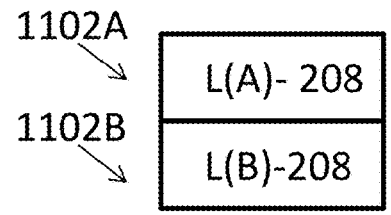

FIG. 11E shows a non-limiting example of another representation of the populated instruction words 1102A/B, which are not in mapped instruction format and for which instruction operation-ALU association is contained in a data field by the ALU ID and link L to where instruction operations A and B can be retrieved.

In this example, the particular combination of the ALU configuration and the instruction set did not result in any savings in the number of instructions that needed to be executed. Nonetheless, if the processor is using a clock speed defined by tmaxlocal then the process executed at the faster clock speed, as discussed above.

Example 2

Figure 12A:
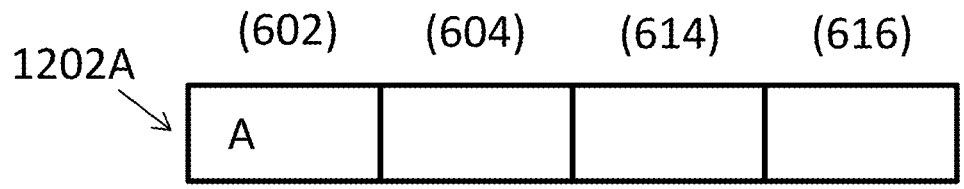
FIGS. 12A-12D are block diagrams of instructions words populated according to an embodiment of the invention.
Figure 12B:
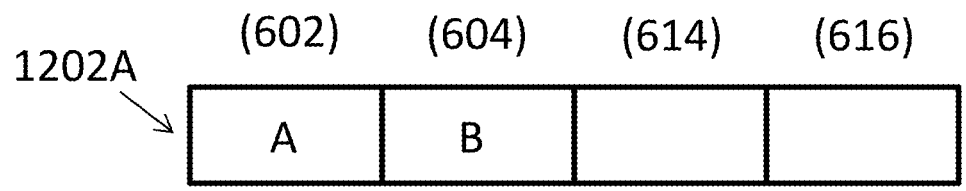

Example 2 uses the same Instruction Set 1 as in Example 1. In this case, the ALU configuration of FIG. 6 is used, and the definition of local is predefined as communication to a partner in a mirror pair (e.g., ALU 602 and 604 are local to each other as a mirrored pair and ALUs 614 and 616 are local to each other as a mirrored pair, but ALUs 602 and 614/616 are not local because while adjacent they are not mirrored). Since there are four ALUs (602, 604, 614, 616), each instruction word 1202 having a mapped instruction word format as shown in FIGS. 12A-12B will have four slots. Also since the ALU configuration of FIG. 6 has 4 ALUs in its entire data path and the definition of local is a mirrored pair, the locally predefined range is smaller than the data path.

As discussed above, the distribution graph of Instruction Set 1 is in FIG. 7A. There are no global operations, and as such at block 802 the processor 400 designates each node as local. At block 803, processor begins a new instruction word 1202A as shown in FIG. 12A. At blocks 804 and 806, processor 400 identifies A=R1+R2 as the critical path and instruction operation A does not (in this case) violate any rule; processor 400 thus assigns instruction operation A to an ALU slot (e.g., ALU 602 in this example) in instruction word 1202A.

At block 808, processor 400 identifies instruction operation B as dependent upon instruction operation A, local to A, the instruction word 1202A is not full (there are still three slots left), and both instruction operations A and B are simple instructions that can be sequentially executed in the same clock cycle. In this example, because local is defined a mirrored pair, since ALU 602 is assigned instruction operation A then a local ALU is available—ALU 604 (not currently in use)—to receive instruction operation B as a qualified dependent node. At block 810, processor 400 assigns B to the slot for ALU 604 in instruction word 1202A as shown in FIG. 12B.

As discussed above, prior art VLIW could not populate instruction word 1202A as shown in FIG. 12B, because VLIW prohibits interdependencies in the same instruction word, and since B is dependent upon A, VLIW could not include A and B in the same word. The embodiment of this example improves over VLIW in that it allows inclusion of both A and B and thus will experience a corresponding reduction in total processing time.

As there are no other nodes to assign, the instruction word 1202A is considered full at block 814, the instruction word full flag is set at block 816, the graph is considered complete at block 818, and the assignment process terminates.

Figure 12C:
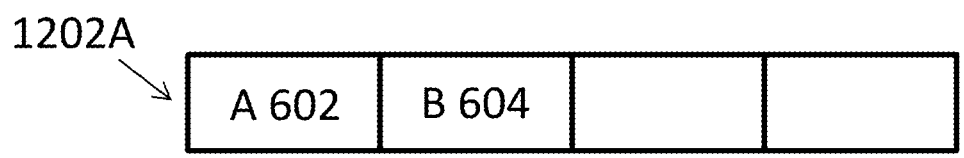
Figure 12D:
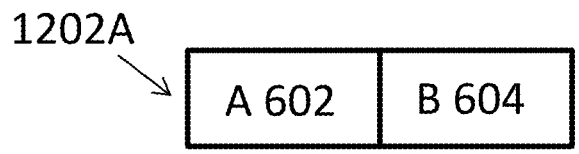

As noted above with respect to FIGS. 11C-E, other storage/instruction word formats could be used, for which non-limiting examples are shown in FIGS. 12C and 12D.

In this example, the particular combination of the ALU configuration, the definition of local, and the instruction set result in a reduction in the number of clock cycles needed, in that two dependent instruction operations could be executed in a single clock cycle as part of a single instruction word. In addition, if the processor is using a clock speed defined by tmaxlocal then the process occurred at the faster processor speed, as discussed above.

Example 3

The environment of Example 3 is the same as Example 2 (the ALU configuration of FIG. 6 is used, and the definition of local is predefined as communication to a partner in a mirror pair, and further presuming that the ALUs can handle complex operations). The Instruction Set 3 is as follows:

$A=R1*R2$ $B=A+R3$

Instruction Set 3 is similar to Instruction Set 1, save that instruction operation A is an act of multiplication rather than addition. Multiplication takes longer than addition, and in this example represents an instruction operation for which the total time for multiplication for instruction operation A and addition for instruction operation B is too long to be completed in the same clock cycle.

Figure 7C:
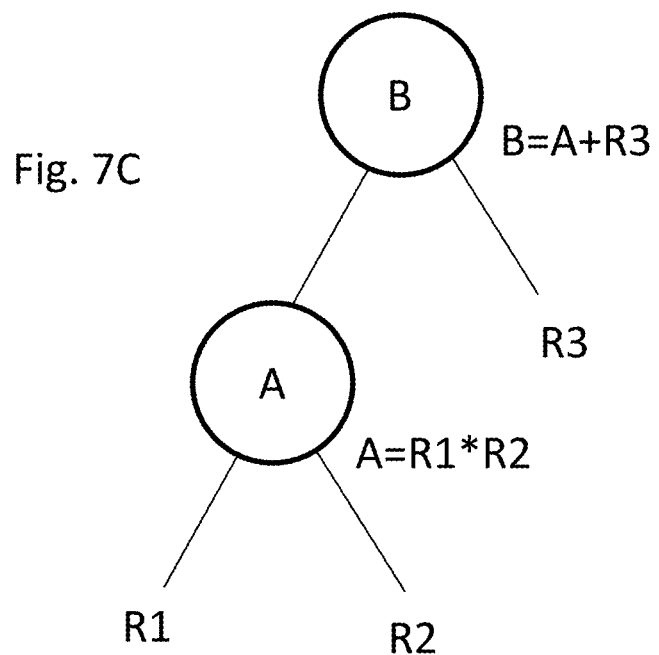
Figure 13A:
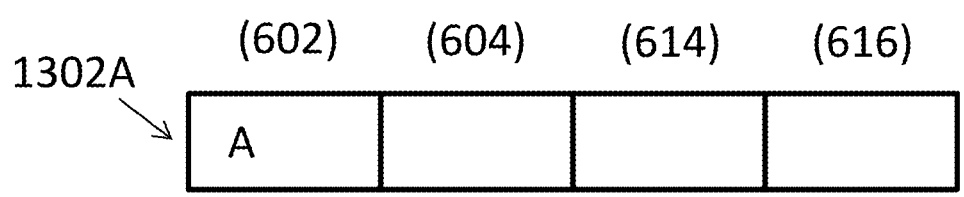
FIGS. 13A-13B are block diagrams of instructions words populated according to an embodiment of the invention.

The distribution graph of Instruction Set 3 is in FIG. 7C. There are no global operations, as all inputs are locally available, and as such at block 802, processor 400 designates each node as local. At block 803, new instruction word 1302A is begun. At blocks 804 and 806, compiler identifies $A=R1*R2$ as the critical path and instruction operation A does not (in this case) does not violate any rule; processor thus assigns instruction operation A to an ALU slot (e.g., ALU 602 in this example) in instruction word 1302A in FIG. 13A.

At block 808, processor 400 identifies instruction operation B as dependent upon instruction operation A, local to A, the instruction word is not full (there are still three slots left). However, because both instruction operations A and B cannot be executed in a single clock cycle (the time needed for the multiplication of A and the addition of B is too long to complete in one clock cycle), B cannot be included in the same instruction word 1302A as this would violate a rule (there isn't enough time in the clock cycle to guarantee completion of both instruction operations A and B).

Since no other dependent node is available to populate instruction word 1302A, control passes to block 812, where processor 400 updates the graph to remove node A from further assignment consideration.

At block 814, the instruction word 1302A is considered complete. Even though slots remain for unassigned ALUs in instruction word 1302A, inclusion of the remaining instruction operation B would be a rule violation. An end of word flag is thus set at block 816, a new word 1302B is needed and created at block 803, and control returns to block 804.

Figure 13B:
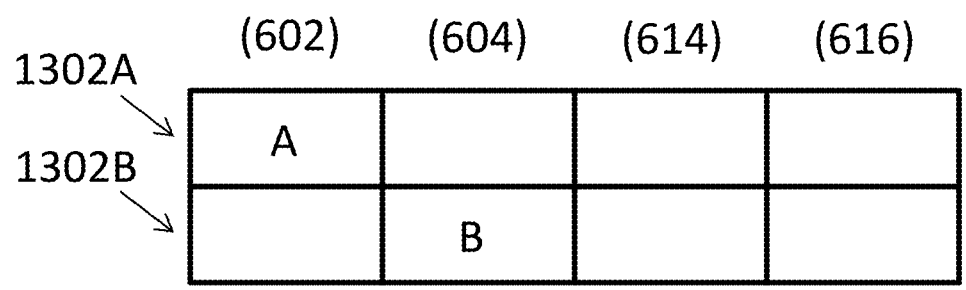

At blocks 804 and 806, compiler identifies instruction operation B=A+R3 as the next critical path (it is all that is left), and B does not (in this case) violate any rule. Since instruction operation B is local to instruction operation A, processor 400 assigns instruction operation B to an ALU that is local to the ALU that is assigned to instruction operation A. In this example, because local is defined a mirrored pair, when ALU 602 is assigned instruction operation A, then a local ALU is available—ALU 604 (not currently in use)—to receive instruction operation B as a qualified dependent node as shown in FIG. 13B.

No further dependent nodes are selected or assigned at blocks 808 and 810 (none remain), the word is determined as full at block 812 (all nodes assigned), the flag is set at block 814 to designate the last occupied slot as the end of word 1202B, the process is determined as complete at block 816 and the process ends.

As with other examples, other formats for storage instruction word could be used such as shown in previously discussed FIGS. 11C-E.

Example 4

Example 4 uses the ALU configuration of FIG. 6, and the definition of local is predefined as a mirrored pair (e.g., ALU 602 and 604 are local to each other as a mirrored pair and ALUs 614 and 616 are local to each other as a mirrored pair, but ALUs 602 and 614/616 are not local because while adjacent they are not mirrored). Since there are four ALUs in the data path 618, each instruction word will have four slots. In this example Instruction Set 4 is:

$A=R1+R2$ $B=R3+R4$ $C=A+$

Figure 7D:
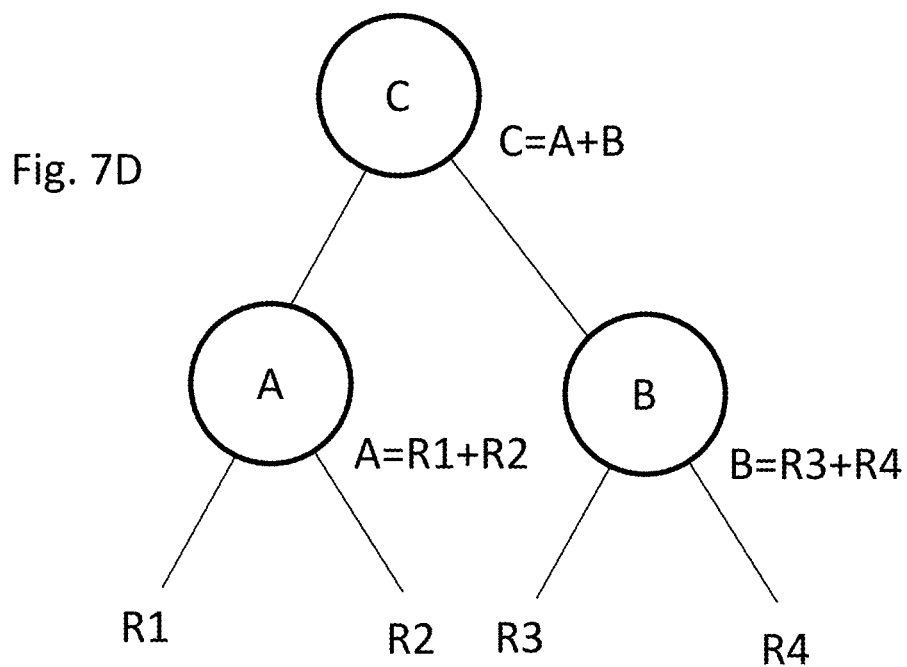

The distribution graph of Instruction Set 4 is in FIG. 7D.

Beginning with block 802, processor 400 designates instruction operations A=R1+R2 and B=R3+R4 as local operations because both can be performed based on local register content (R1, R2, R3, R4). Note the designation of instruction operations A and B as local does not mean that they are local to each other; to the contrary, as discussed below, the ALUs that perform A and B may be beyond local range.

The instruction operation C=A+B would be designated as global, because the ALUs that would execute instruction operations A and B are not likely to be local to each other and thus a global communication would be needed, which cannot be completed in one clock cycle.

Figure 14A:
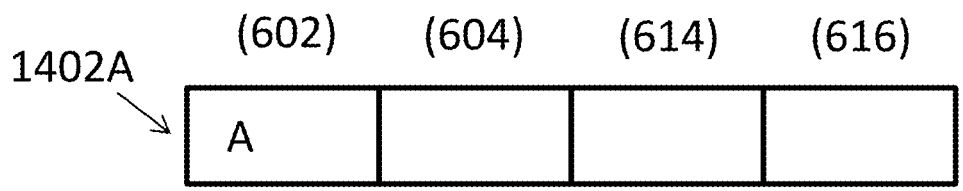
FIGS. 14A-14C are block diagrams of instructions words populated according to an embodiment of the invention.

With the nodes designated as local/global, processor at block 803 begins a new instruction word 1402A in FIG. 14A, and at block 804 selects a node for assignment to an ALU in instruction word 1402A. By way of non-limiting example, if the nodes in FIG. 7D are each one step, then at block 902 instruction operations A=R1+R2 and B=R3+R4 are both identified as of equal critical path length as they have the same number of steps; instruction operation A can be chosen for convenience. At block 904, inclusion of instruction operation A in instruction word 1402A is determined not to violate any rule. Thus, at block 908 node A is selected for assignment and control passes to block 806. At block 806 an ALU is selected for node A and placed into instruction word 1402A. In this case instruction operation A is independent and of first assignment, and as such, processor can effectively choose any ALU, e.g., ALU 602 as shown in FIG. 14A.

At block 808, processor 400 identifies instruction operation C as a dependent upon instruction operation A. However, since instruction operation C has been designated global, it cannot be included in the same instruction word as the instruction operation on which it depends. No other dependent nodes are present, and control thus passes to block 812.

At block 812, processor 400 updates the dependency graph to remove the assigned node A from further assignment consideration. At block 814, processor 400 determines that instruction word 1402A is not yet complete because it has two spaces remaining, and there are still nodes to add that would not violate any rule for the current instruction word 1402A. Control thus returns to block 804 for consideration of the remaining portion of the dependency graph.

Per block 902, processor 400 seeks out the node along the longest remaining critical path, which in this example is instruction operation B=R3+R4 as resident on the corresponding node. Instruction operation B does not violate any rule at 904, and can thus be assigned to the current instruction word 1402A.

Figure 14B:
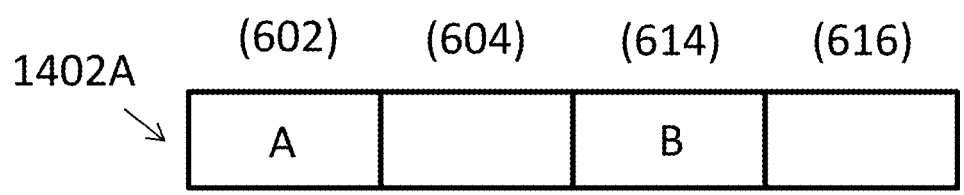
Figure 14C:
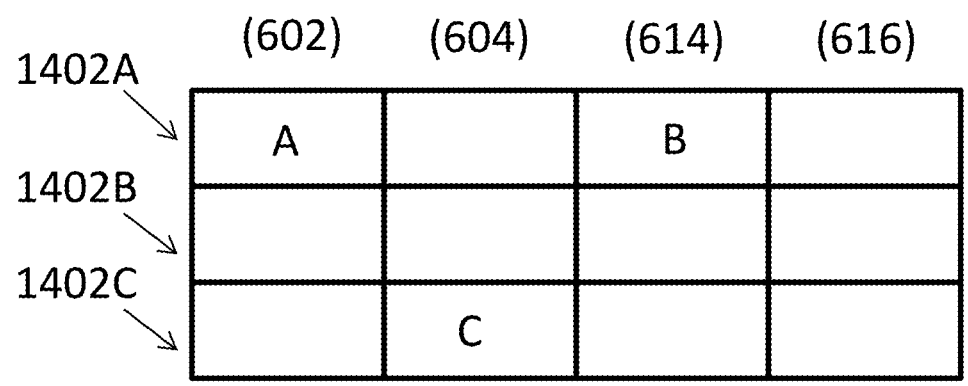

At block 806, the instruction operation of node B is assigned to an ALU. Since instruction operation B is in an independent node, processor 400 may assign it to any ALU that is not already in use, and may avoid any ALU in a local relationship with an ALU in use. Thus ALU 602 is unavailable due to prior assignment in the instruction word 1402, and processor 400 may prefer to avoid ALU 604, as it is part of an existing local relationship with in-use ALU 602. In this example, processor 400 assigns instruction operation B to ALU 614 in a corresponding slot of word 1402A as shown in FIG. 14B.

Control then passes to block 808 to look for dependent nodes from node B. Processor 400 identifies node C as dependent upon node B. However, since node C is global and the corresponding instruction operation cannot be included in the same instruction word as the node upon which it depends, control passes to block 812.

At block 812 the dependency graph is updated to remove the assigned node B from further consideration.

Control then passes to block 814 to see if the instruction word 1402A is complete. In this case, the instruction word 1402A is complete because the only remaining instruction operation C=A+B cannot be included for the reason discussed above. Control at block 816 thus sets the flag to indicate the word is full. At block 818, a new word is needed, and control returns to block 803, to begin a new instruction word 1402B.

At block 804, the critical path is node C as the sole remaining node, but it is not selected because inclusion of instruction operation C in instruction word 1402B would violate a rule. Specifically, node C is global, and thus must wait at least one clock cycle from the last result of instruction operations A and/or B to allow time for global communication. At block 804, processor 400 will thus seek another node on the next least critical path; since no such node exists (node C is the last node), no node is assigned at block 806. Similarly, no node is assigned at block 808, no dependent node is assigned at block 810, the graph is updated (no change), the instruction word 1402B is determined full at block 814 (no further nodes to enter), the flag is set to indicate the complete word at block 816, the next instruction word 1402C is generated at block 803, and control returns to block 804 for the next node assignment.

At block 804, the critical path is node C as the sole remaining node, but this time it does not violate any rule, because intervening instruction word 1402B was added to account for the global communication; as each instruction word occurs over a single clock cycle, this additional instruction word 1402B delays execution of instruction operation C by one clock cycle to give enough time for the results of instruction operations A and/or B to reach and be selected by the ALU that will be assigned to instruction operation C. At block 806, instruction operation C is assigned to an ALU and inserted into instruction word 1402C. Under these circumstances, virtually any ALU can be used for instruction operation C because none are in use (or will be) and there is no need/benefit from local communication. For convenience, ALU 604 can be selected, since it is the local of ALU 602 that generated output from instruction operation A from which instruction operation C depends and placed in a slot corresponding to ALU 604, although this need not be the case.

No dependent nodes are selected or assigned at blocks 808 and 810 (none remain), the instruction word 1402C is determined as full at block 812 (all nodes assigned), the flag is set at block 814 to designate the last slot of word 1402C as the end of word, the process is determined as complete at block 816 and the process ends.

As with other examples, other formats for storage instruction word could be used such as shown in FIGS. 11C-E.

Example 5

Figure 7E:
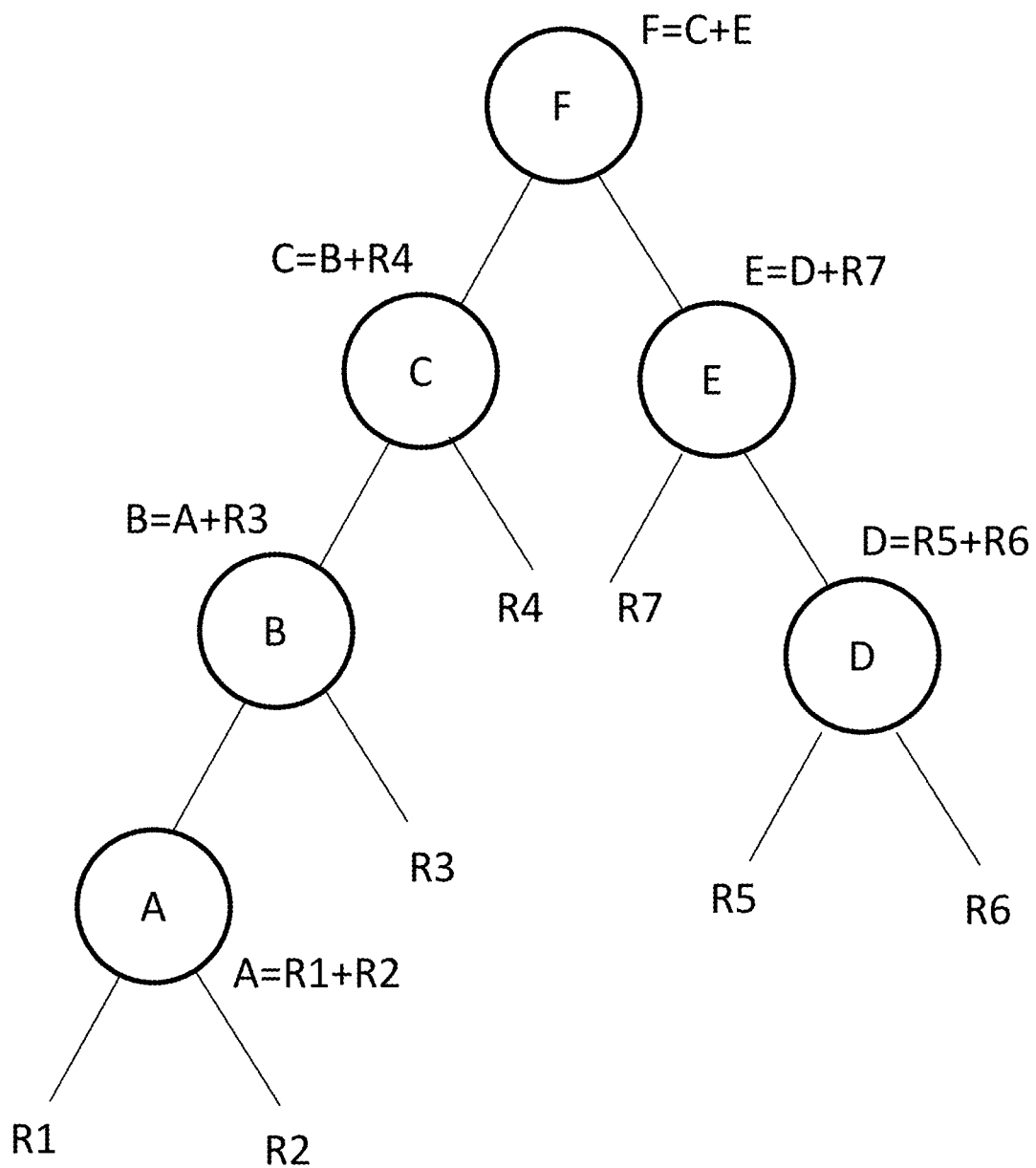

Example 5 uses the ALU configuration of FIG. 6, and the definition of local is predefined as a mirror pair (e.g., ALU 602 and 604 are local to each other as a mirrored pair and ALUs 614 and 616 are local to each other as a mirrored pair, but ALUs 602 and 614/616 are not local because while adjacent they are not mirrored). Since there are four ALUs, each instruction word will have four slots. In this example Instruction Set 5 is:

$A=R1+R2$   1:

$B=A+R3$   2:

$C=B+R4$   3:

$D=R5+R6$   4:

$E=D+R4$                                     5:

$F=B+E$                                      6:

The distribution graph of Instruction Set 4 is depicted in FIG. 7E.

Beginning with block 802, compiler designates instruction operations A=R1+R2 and D=R5+R6 as local operations, because both can be performed based on local register content (R1, R2, R5, R6). Note the designation of instruction operations A and D as local does not mean that they are local to each other; to the contrary, as discussed below, the ALUs that perform A and D may be beyond local range.

Instruction operation B=A+R3 is also designated local because register content of R3 is locally available, and instruction operation B can be assigned to an ALU local to whatever ALU is assigned to execute instruction operation A. Similarly, instruction operation C=B+R4 is designated as local, because register content of R4 is locally available, and thus instruction operation C can be assigned to an ALU local to whatever ALU is assigned to execute instruction operation B. Similarly, instruction operation E=D+R7 is designated as local, because register content of R7 is locally available, and thus instruction operation E can be assigned to an ALU local to whatever ALU is assigned to instruction operation D. Instruction operation F=C+E would be designated as global, because the ALUs that would execute instruction operations C and E are not local to each other and thus a global communication will be needed which cannot be guaranteed to complete in one clock cycle.

At block 803, processor 400 begins a new instruction word 1502A.

At block 804, processor 400 selects a node for assignment to an ALU in instruction word 1502A. By way of non-limiting example, if the nodes in FIG. 7E are each one step, then instruction operation A=R1+R2 is determined at block 902 to be the critical path because the path from A-F (A-B-C-F) has the most steps (four) in the dependency graph. (By way of counter example, if node E for some reason had five steps, then D-F might be the critical path.) At block 904, instruction operation A is determined not to violate any rule. Thus, at block 906, node A is selected for assignment.

Figure 15A:
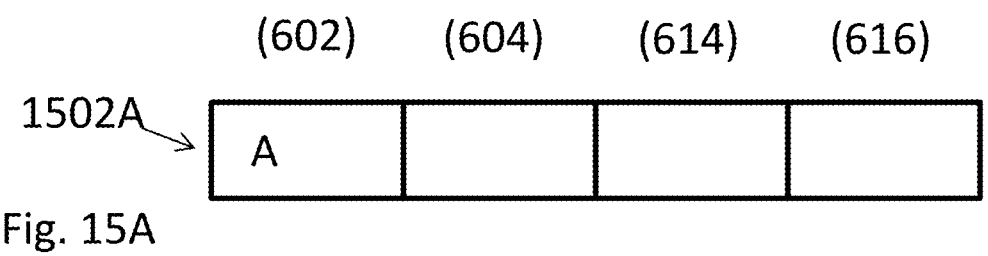
FIGS. 15A-15J are block diagrams of instructions words populated according to an embodiment of the invention.
Figure 15B:
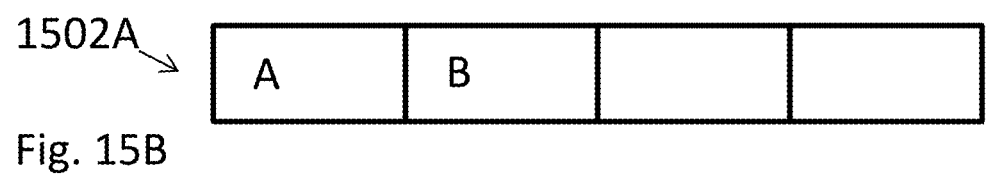

At block 806, an ALU is selected for instruction operation A as resident in node A, and placed into an instruction word 1402A. In this case there are no pending rules in play, and processor 400 may assign instruction operation A to any ALU that can handle it, e.g., ALU 602 such as shown in FIG. 15A.

At block 808, processor 400 identifies node B as a dependent node that can be added to instruction word 1502A because (1) instruction operation B is dependent upon instruction operation A, (2) instruction operation B was designated as local, (3) a local ALU (604) is available, (4) the instruction word 1502A is not full, (5) instruction operations A and B can be completed in one clock cycle and (5) no other rule prevents it.

Processor 400 does not identify any other dependent nodes that can be added to the word, as there are no other nodes directly dependent upon node A. Node C is indirectly dependent from nodes A through B, but with standard ALUs per this example three sequential operations could not be completed in a clock cycle and the ALUs are not otherwise configured to process 3 inputs. The same would apply to any nodes further dependent from node C. (However, if an ALU was available that could handle three inputs and/or circumstances existed by which three sequential instruction operations could be performed in one clock cycle, then C could potentially be inserted into the same word.)

At block 810, the instruction operation of identified node B is assigned to ALU 604 as local to ALU 602 on which it depends, and inserted into instruction word 1402A per its dependent relationship as shown in FIG. 14B.

At block 812, the dependency graph is updated to remove the assigned nodes from those that still need assignment.

At block 814, the instruction word 1402A is determined to not yet be complete, because it has two slots remaining, and there are still nodes to add that would not violate any rule for the current instruction word. Control thus returns to block 804 for consideration of the remaining portion of the dependency graph.

At this point, the previously assigned nodes A and B are no longer considered for further assignment. Per block 902, the system seeks out the node along the longest remaining critical path, which in this example is instruction operation D=R5+R6. Inclusion of instruction operation D in word 1502A does not violate any rule at 904, and can thus be assigned to the current instruction word 1502A.

Figure 15C:
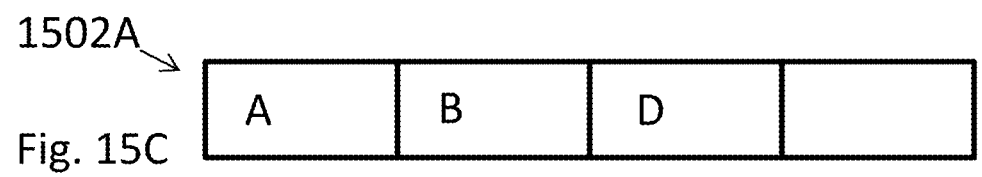

At block 806, processor 400 assigns the instruction operation of node D to an ALU. Since node D is an independent node, compiler may assign it to any ALU that is not already in use and/or part of another local relationship. Thus ALU 602 and 604 are unavailable due to prior assignment in the instruction word 1502A, but even if one was in use while the other was unassigned, processor 400 may prefer to avoid either, as they are part of an existing local relationship. In this example, processor assigns instruction operation D to ALU 614 corresponding to that slot of word 1502A as shown in FIG. 15C.

Figure 15D:
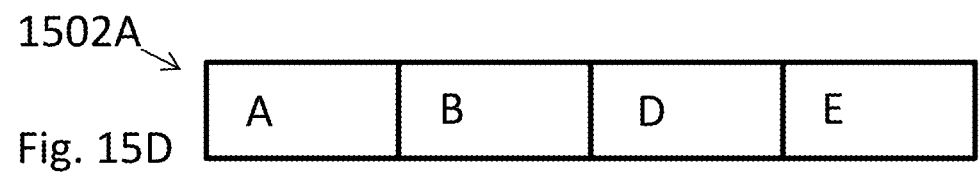

At block 808, processor 400 identifies node E as a dependent node that can be added to instruction word 1502A because (1) instruction operation E is dependent upon instruction operation D, (2) instruction operation D was designated as local, (3) a local ALU (616) is available, (4) the instruction word 1502A is not full, (5) instruction operations D and E can be completed in one clock cycle, and (6) no other rule prevents it. At block 810, processor 400 assigns instruction operation E to ALU 616 corresponding to that slot of word 1502A as shown in FIG. 15D.

Control then passes to block 814 to see if the instruction word 1502A is complete. In this case, the instruction word 1502A is complete for at least two reasons. First, the word 1502A is full, in that all slots are filled with instructions. Second, the only remaining instruction operations C=B+R3 and F=C+E cannot be included, instruction operation C for the reason discussed above, and instruction operation F because as designated global it cannot be present in the same instruction word as the local instruction operation upon which it depends (the two could not be executed in parallel). Control at block 816 thus sets the flag to indicate the word is full. At block 818, processor 400 determines that instruction operations still remain for assignment, so a new word 1502B is created at block 803 as shown in in FIG. 15E.

At block 804, processor 400 identifies the next node as C, which is the lowest in the critical path. Inclusion of instruction operation C in word 1502B would not violate any rule, and thus at block 806, instruction operation C can be assigned to the current instruction word 1502B.

Figure 15E:
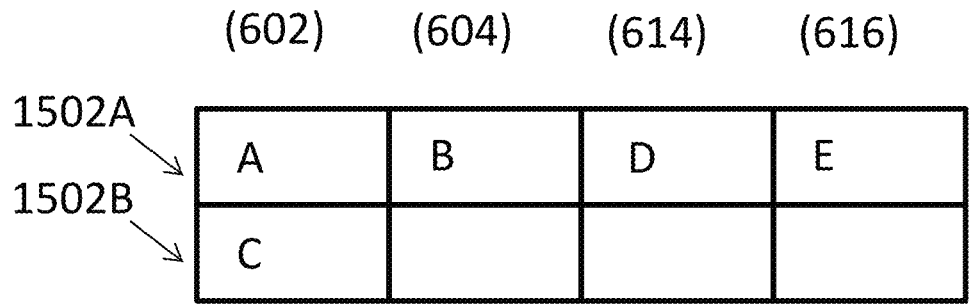

Since instruction operation C is dependent upon instruction operation B, and local to the ALU to which instruction operation B is assigned, processor 400 preferably assigns instruction operation C to an ALU local to the ALU to which instruction operation B is assigned. Since instruction operation B is assigned to ALU 604 and ALU 602 is local, then ALU 602 is the preferred selection. Processor 400 assigns instruction operation C to ALU 602, corresponding to that slot of word 1502B as shown in FIG. 15E.

At block 808, compiler looks for dependent nodes from C that it can include in the same word. Node F is dependent from C (F=C+E). However, as discussed above instruction operation F requires a global communication, and thus would violate a rule if placed in the same instruction word as instruction operation C. Thus, instruction operation F cannot be added to the instruction word 1502B. Similarly, any further dependent node that depends from node F could not be added for the same reason.

At block 812 the dependency graph is adjusted to account for the assignment of the instruction operation of node C.

At block 814, the word 1502B is considered complete. Even though slots remain, inclusion of the remaining node F would be a rule violation. A flag is thus set at block 816, a new instruction word 1502C is needed at block 818, and is created at 803.

Figure 15F:
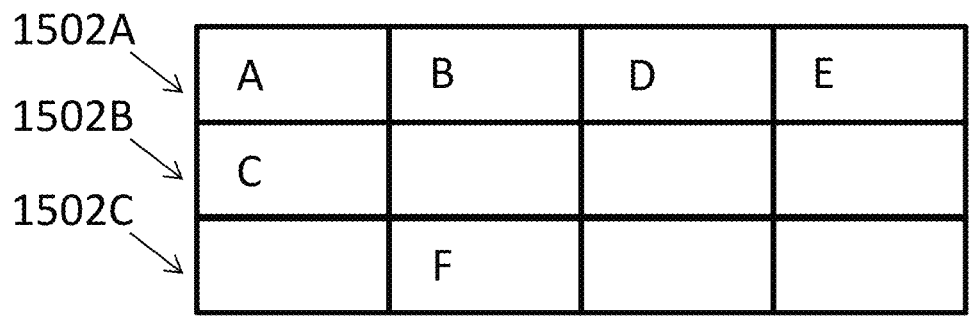

At block 804, the critical path is node F as the sole remaining node. Selection options for inclusion in instruction word 1502C at block 806 are limited. The only available option in this case is ALU 604. The reason arises from a combination of circumstances. First, with F=C+E, instruction operation E was two instruction words prior at 1502A, and thus the result of E will have a clock cycle from the interceding instruction word 1402B to travel globally to wherever it needs to go. Second, ALU 604 is local to ALU 602 that performed instruction operation C, such that the result of instruction operation C is locally available to provide for instruction operation F. Thus if instruction operation F is assigned to 604, it can locally receive the output of instruction operation C and globally receive the output of instruction operation E. The assignment is shown in FIG. 15F. After that, the instruction word 1502C would close in the manner described above.

Figure 15G:
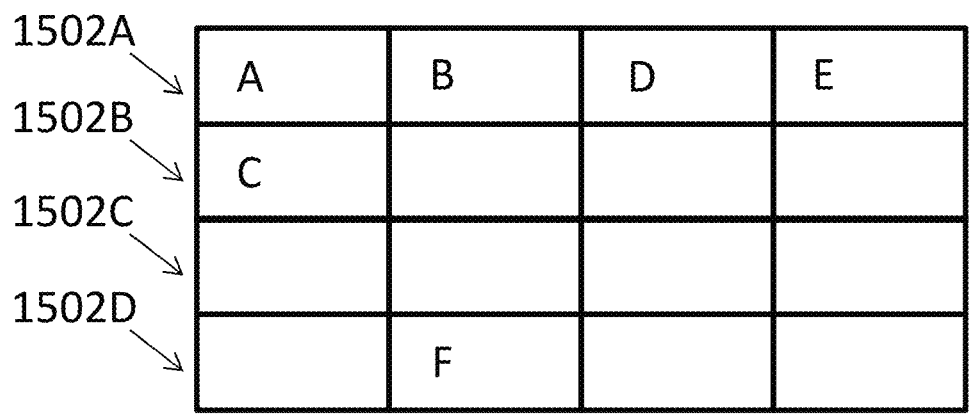

In contrast, no other ALU in instruction word 1502C could accommodate instruction operation F, since all of the other ALUs would be global to the ALU 602 that produces the output of C. If ALU 604 were for any reason unavailable in instruction word 1502C, then the process would have to cycle through again, to create an new instruction word 1502D, for which in the given the circumstances, instruction operation F could be placed in any slot/ALU, such as shown in FIG. 15G.

Figure 15H:
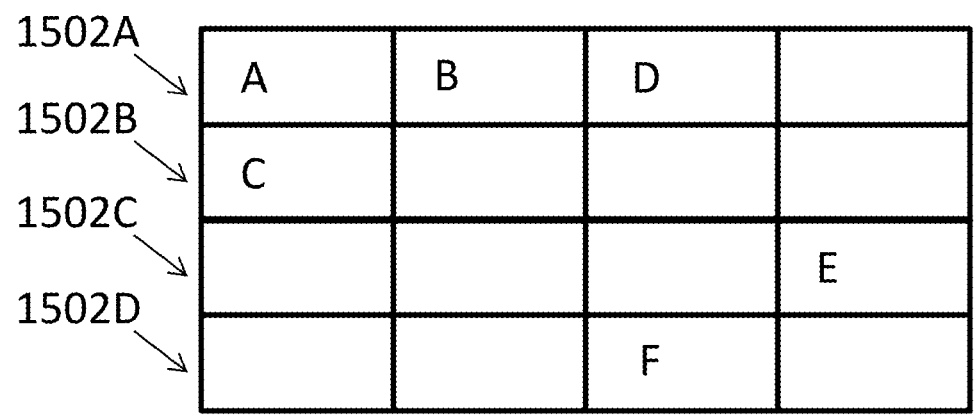

In the above examples, each instruction operation is described as being completed in one clock cycle. However, there are many instruction operations that cannot be completed in one clock cycle, and thus the result of that instruction operation may not be ready for the next instruction word. Processor 400 accounts for this by delaying insertion of a dependent node into a new word for as many clock cycles as needed for the instruction operation to complete. For example, in Example 5 if instruction operation D required two full clock cycles to complete, then instruction operation E would not be inserted into word 1502A, but instead would have to wait for insertion until instruction word 1502C as shown in FIG. 15H. Instruction operation F could therefore only be inserted in instruction word 1504 at ALU 614, as that ALU is local to the ALU that generated the output of instruction operation E, and global to the ALU that generated the output of instruction operation C; if 614 were unavailable for any reason, then instruction operation F would need to be placed into a new word 1502E (not shown).

Figure 15I:
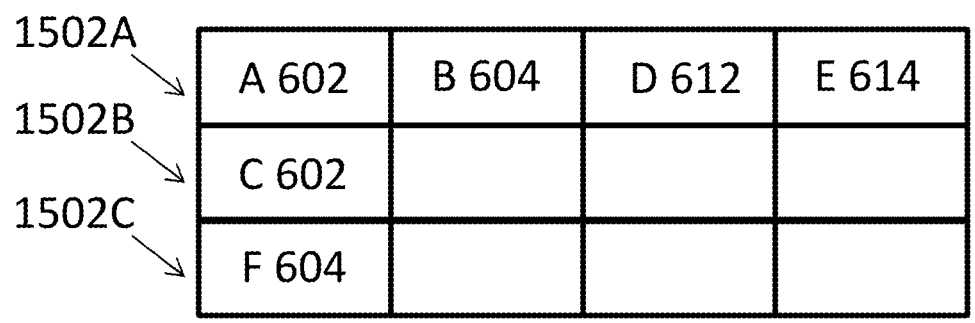
Figure 15J:
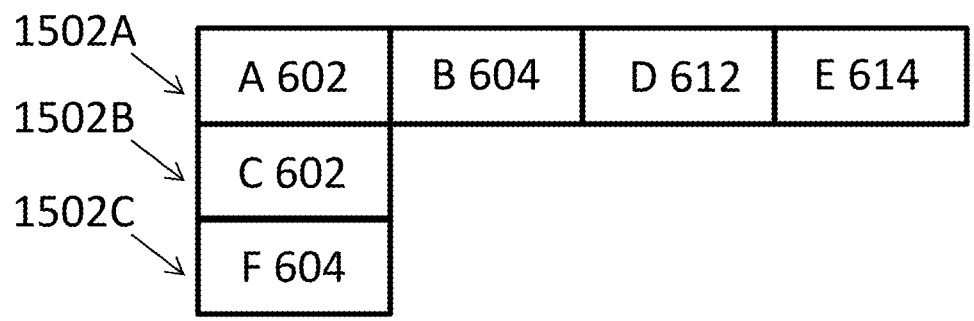

FIGS. 15A-15H utilized a mapped instruction word format for instruction words 1502. However, as discussed above, this need not be the case if the individual instruction operations as associated with the slots, have an ALU identifier. FIGS. 15I and 15J show non-limiting examples of formats of instruction words.

The above process may be run once, or multiple times for optimization purposes. An overall goal of the compiler's efforts is to minimize the number of instruction words. In some cases, strict adherence to the process may not satisfy that goal. For example, an earlier decision to place certain instructions in certain slots may influence what instructions can be inserted in later instruction words, creating an overall non-optimal set of instruction words. For example, if a particular independent node is placed in the last available slot of a word, this may force a dependent instruction node into a different instruction word. It may be optimal instead for that particular independent node and its dependent node to be in the same instruction word, and the noted last slot reserved for a different independent instruction node. In another example, in Examples 1-5 above, many of the ALUs are not used, and it may be possible during optimization (such as at block 804 and/or after completion of the initial ALU assignment) to insert later instruction operations into some of these empty slots.

A particular goal of the optimization process may be to minimize the number of global communications.

Optimization considerations may thus be considered rules in the flowchart of FIG. 8, e.g., normally the other rules would allow placement of an instruction into a slot, but a finding that such placement is not optimal for the overall execution of the program may override those rules in favor of not including the instruction in a particular slot. The reverse is true for empty slots, in that if a slot is empty when applying the base rule set, but optimization indicates that it should filled with another instruction (perhaps from a distant unrelated branch of the graph) without violating the guarantee, then optimization considerations can trump the rule set.

The assignment of instruction operations to instruction words may be performed before and after assignment of registers. Specifically, there are only a finite number of registers that can provide values for the ALUs to process. However, during the earlier stages of compiling the program, it may be assumed that there is no limit on the number of registers, and then later as an optimization step the number of registers can be limited. The methodology of FIG. 8 may thus be performed before the assignment of registers. Once registers are later considered fixed, the process may be rerun at least in part, to make changes in response to any conflict in register allocations.

As noted above, each core of the processor 400 may have its own data path. Thus, separate instruction words can be created for each data path and executed simultaneously by its particular core.

Once the program is compiled into the instruction words 1002, the processor 400 can execute sequentially the instructions words 1002A-n in a manner known in the art. The instruction operations in each instruction word can be performed in parallel, and the instruction words are executed in the compiled order.

As noted above, the designation of local/global at block 802 may not be entirely accurate, and thus the assignment of certain instruction operations to instruction words and/or ALU may raise violations. During execution, scheduler 410 of processor 400 identifies violations in real time, e.g., if an instruction operation was compiled as local in a prior instruction word yet would result in a violation, scheduler 410 can delay the execution of the instruction word by one or more clock cycles to provide time for the global signals to reach their destination.

Figure 16:
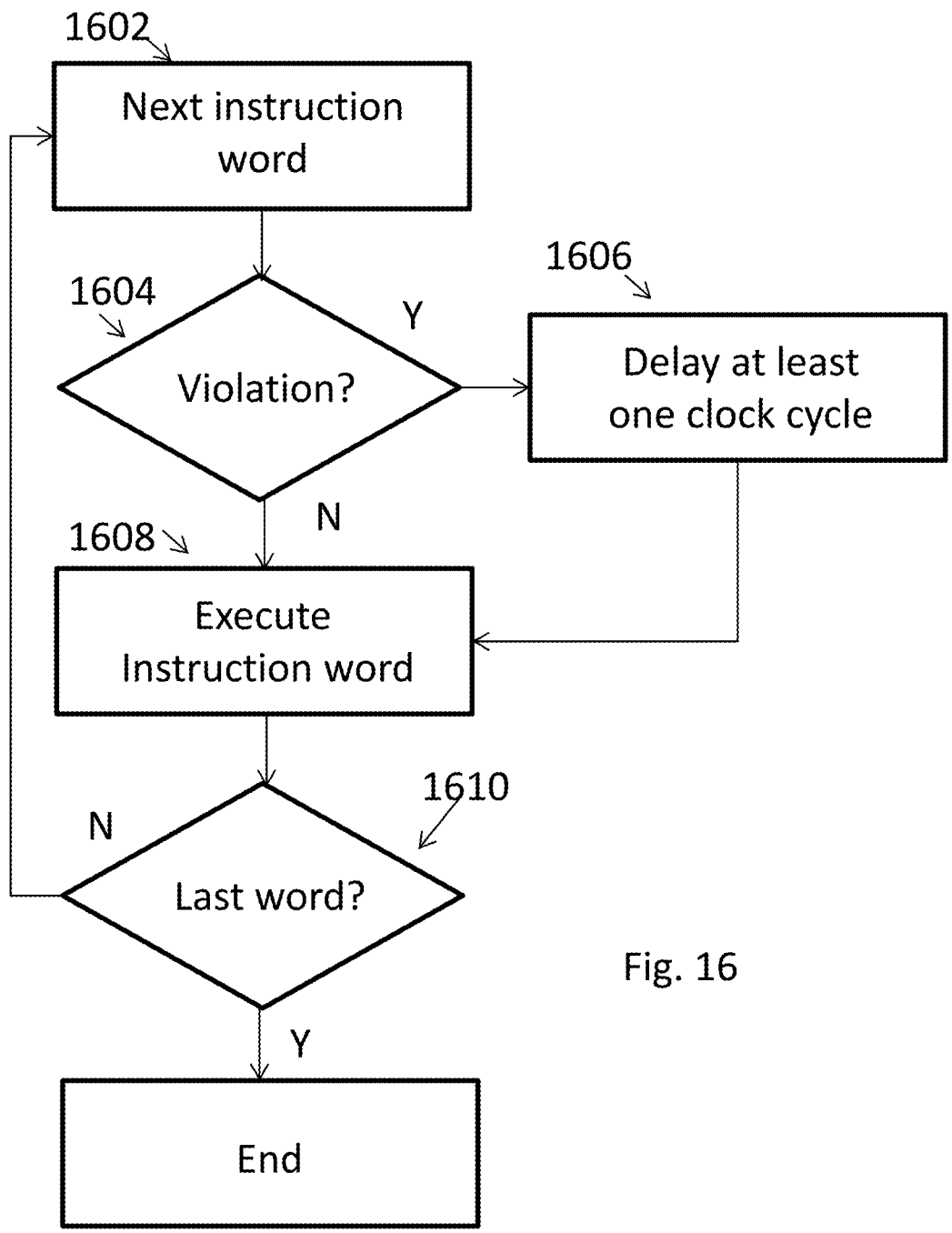
FIG. 16 is a flowchart of an embodiment of the invention for executing instruction words.

An embodiment of the execution steps by processor 400 are shown in FIG. 16. At block 1602, the next instruction word is selected (which for the first run would be the first instruction word). At block 1604, processor 400 analyzes the selected instruction word to see if its execution would in any way violate the guarantee. If not, processor 400 executes the instruction word at block 1608. If there is a violation, then processor 400 at block 1606 delays the execution process by as many clock cycles as needed for the violation to clear, i.e., if two clock cycles are needed for the global communication before executing the next instruction word, then processor 400 will delay execution for two clock cycles before continuing to block 1608 for execution of the instruction word. Processor 400 at block 1610 determines whether the executed instruction word is the last word, and if so, the processes ends and if not, control returns to 1502 for the next instruction word. The act of delaying may be to taking no action (i.e., not sending an instruction word), generating an instruction word that lacks instruction operations, and/or generating an instruction word that contains instruction operations for the ALUs to take no action during a corresponding clock cycle. The invention is not limited to the nature of how the delay is executed.

Figure 17:
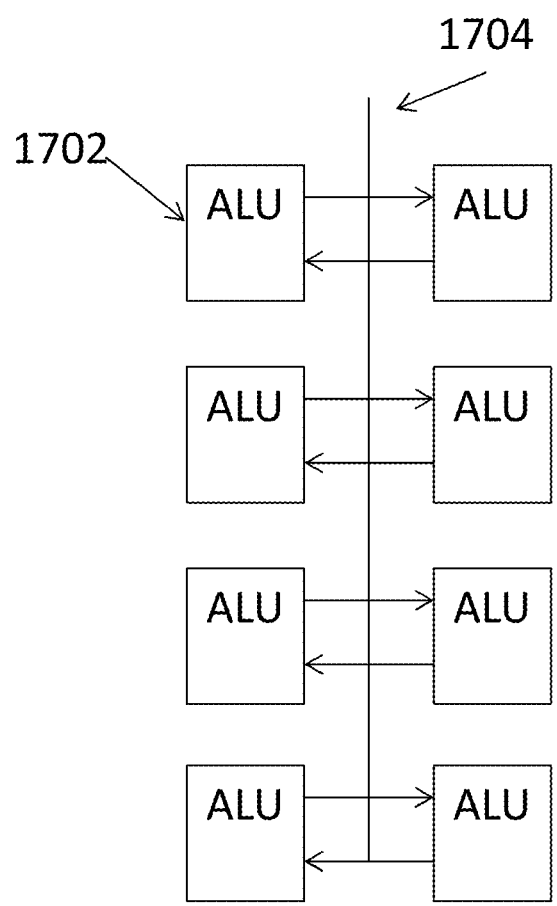
FIGS. 17-21 are embodiments of different data paths.
Figure 18:
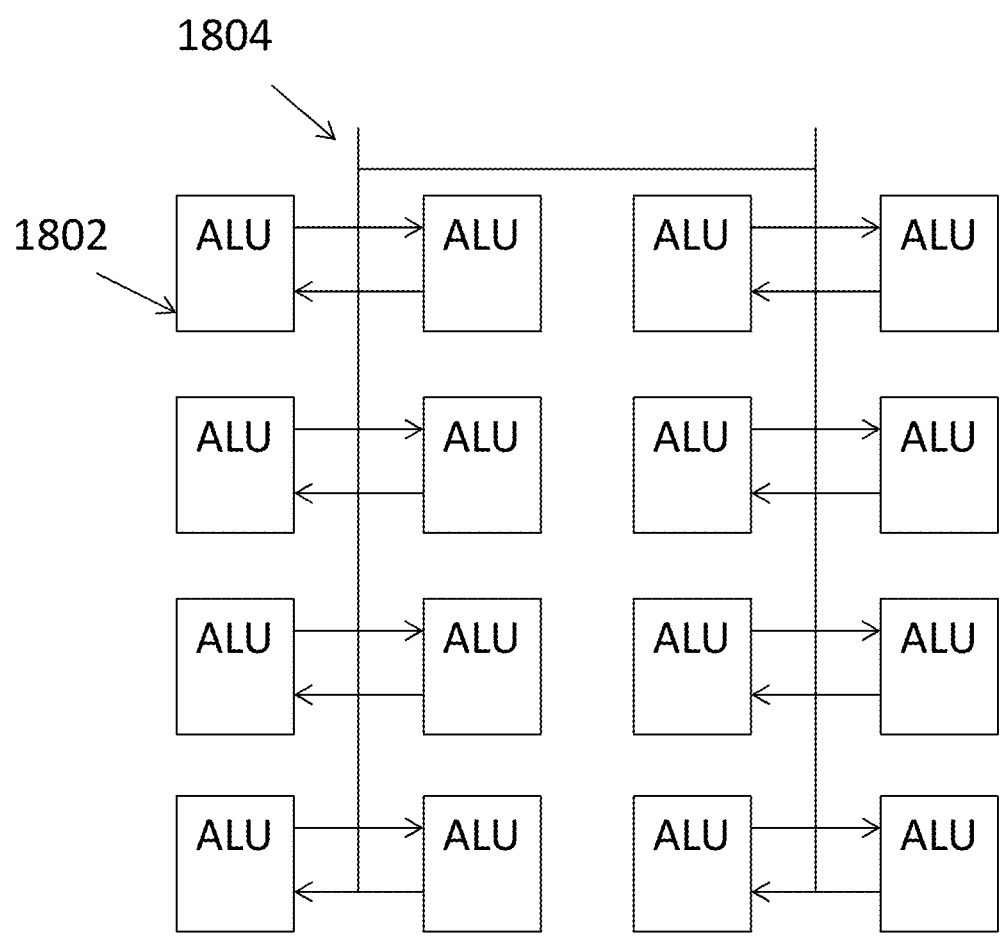

Embodiments of the invention are scalable. As discussed above, FIG. 6 shows a data path with four ALUs. FIG. 17 shows a data path with eight ALUs 1702 connected by a pathway 1704. FIG. 18 shows a data path with sixteen ALUs 1802 connected by a pathway 1804. The number of ALUs within a data path may only be limited by the size, shape and desired expense of processor 400.

Figure 19:
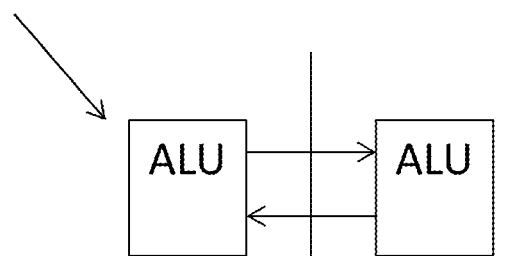
Figure 19:
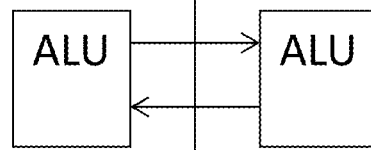
Figure 19:
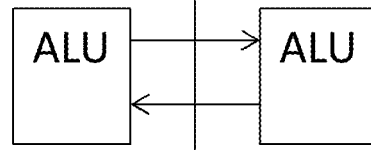
Figure 19:
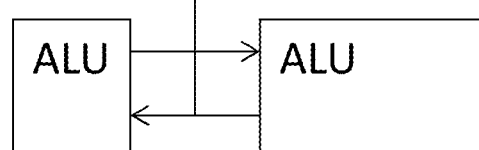
Figure 20:
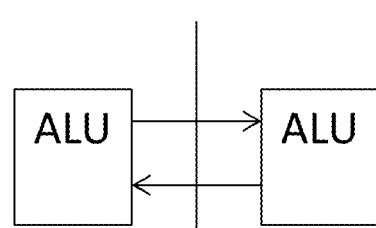
Figure 20:
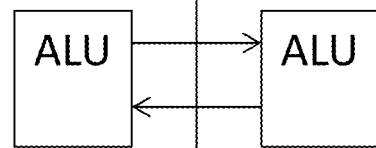
Figure 20:
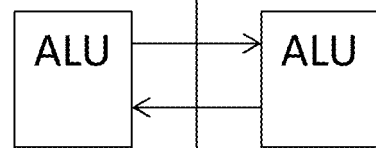
Figure 20:
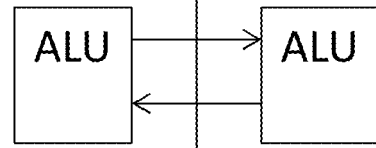
Figure 20:
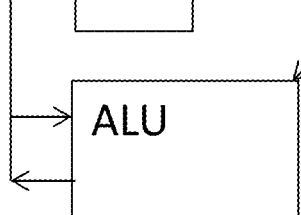

As discussed above, ALUs may be complex or simple, and data paths tend to include at least one of each. In FIGS. 6, 17 and 18, some of the ALUs may be complex, such by way of non-limiting example as shown in FIG. 19 where the configuration includes seven simple ALUs 1902 and one complex ALU 1904. In another embodiment, complex ALU 2004 may be provided and available globally to mirrored local ALUs 2002, such as shown in FIG. 20.

Figure 21:
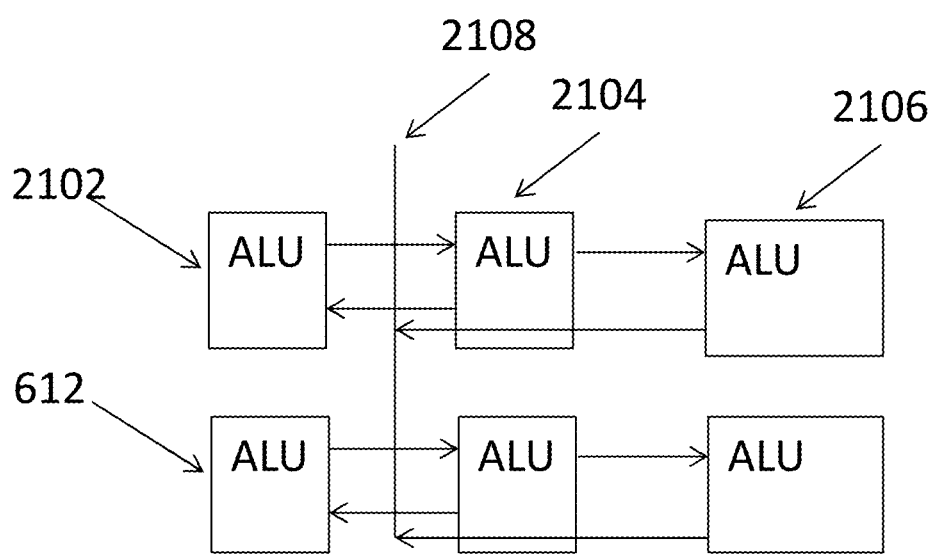

Referring now to FIG. 21, another embodiment of the invention is shown. In this embodiment, a mirrored ALU pair of simple ALUs 2102 and 2104 are matched with a complex ALU 2106. ALUs 2102 and 2104 along with pathway 2108 are the same as described with respect to FIG. 6. In addition, ALU 2104 has an output on a different side from the side that faces ALU 2102, and that output feeds a side of complex ALU 2106. The output of ALU 2106 may return to pathway 2108, which allows transmission to the input of ALU 2102 or 2104; in addition and/or the alternative, the output of ALU 2106 may go directly into ALU 2104.

There are a variety of definitions of local that could be used in the above embodiment. By way of non-limiting example, local can be defined as any communication between ALUs 2102/2104, 2104/2106 and ALU 2104 w/pathway 2108. Local could be defined as any communication between ALUs 2102/2104 and output from 2104 to 2106, but not output from 2106 to 2102 or 2104 (the distance being long enough to perhaps qualify as global).

Figure 22:
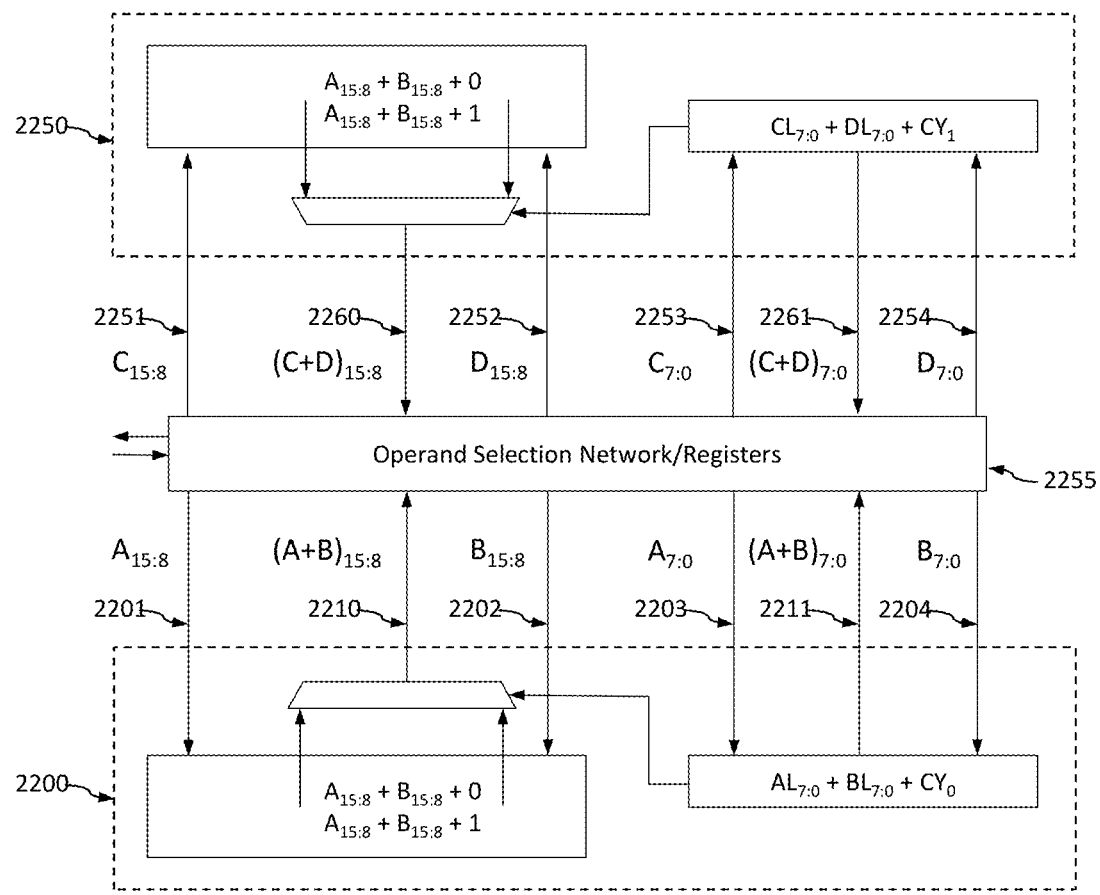
FIG. 22 shows a layout of a mirrored ALU pair such as shown in FIG. 5.

FIG. 22 shows an example of a more detailed layout of a mirrored ALU pair such as shown in FIG. 5, with a pair of mirrored ALUs 2200 and 2250 facing each other and separated by the collection of operand selection units and registers (hereinafter "operand selection network/registers"), shown generally at 2255. The definition of local for this embodiment may be the distance between communications from ALU 2200 and 2250 to each other through the operand selection network 2255, which within such distance includes any values present in the registers that are to be provided to ALU 2200 and/or 2250. The definition of local may exclude or include communications of either ALU 2200, or 2250 to itself.

In FIG. 22, the lowest significant bits of operand A are received by ALU 2200 from operand selection network 2255 via coupling 2203. The most significant bits of operand A are received by ALU 2200 from operand selection network 2255 via coupling 2201. The lowest significant bits of operand B are received by ALU 2200 from operand selection network 2255 via coupling 2204. The most significant bits of operand B are received by ALU 2200 from operand selection network 2255 via coupling 2202. The lowest significant bits of result (A+B) of ALU 2200 are sent to operand selection network 2255 via coupling 2211. The most significant bits of result (A+B) of ALU 2200 are sent to operand selection network 2255 via coupling 2210.

The lowest significant bits of operand C are received by ALU 2250 from operand selection network 2255 via coupling 2253. The most significant bits of operand C are received by ALU 2200 from operand selection network 2255 via coupling 2251. The lowest significant bits of operand D are received by ALU 2200 from operand selection network 2255 via coupling 2254. The most significant bits of operand D are received by ALU 2200 from operand selection network 2255 via coupling 2252. The lowest significant bits of result (C+D) of ALU 2200 are sent to operand selection network 2255 via coupling 2261. The most significant bits of result (C+D) of ALU 2200 are sent to operand selection network 2255 via coupling 2260.

Figure 23:
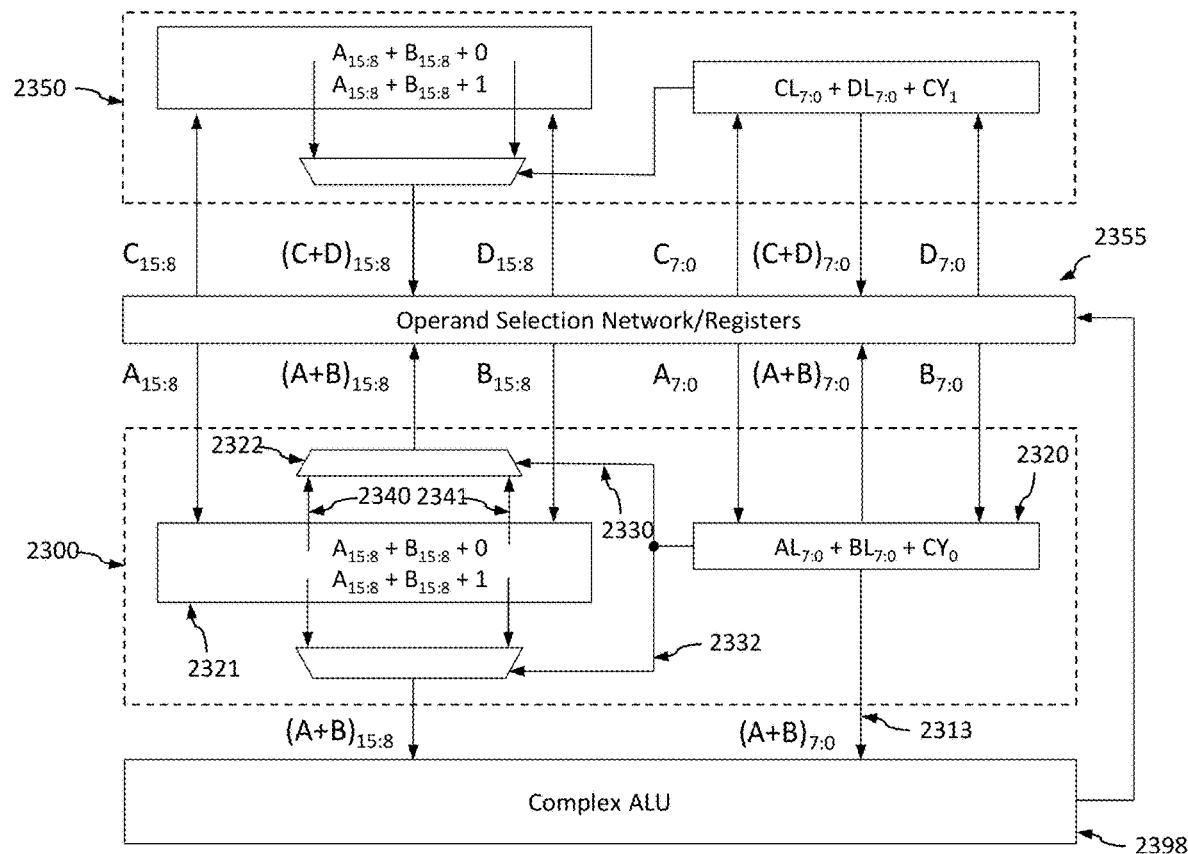
FIG. 23 shows a layout of a mirrored ALU pair in combination with a complex ALU such as shown in FIG. 21.

FIG. 23 shows a more detailed layout of a mirrored ALU pair in combination with a complex ALU such as shown in FIG. 21, with a pair of mirrored ALUs 2300 and 2350 facing each other, and separated by the collection of operand selection units (see 215/220/221/222 discussed above) and registers (hereinafter "operand selection network/registers"), shown generally at 2355, and for which ALU 2300 sends its output to complex ALU 2398. The definition of local for this embodiment may be defined by the distance between adjacent ALUs. Thus local communications include: (a) communications from ALU 2300 and 2350 to each other, through the operand selection network 2355 (which within such distance includes any values present in the registers that are to be provided to ALU 2300 and/or 2350), (b) communications from ALU 2300 to complex ALU 2398, and (c) communications from complex ALU 2398 to ALUs 2300 and/or 2350 via operand switch network/registers 2355. Under such a definition, communications from ALU 2350 to complex ALU 2398 are global because they are not adjacent (the output of ALU 2350 would need to travel through ALU 2300 to reach ALU 2398), although another definition of local could be preset that would consider such communications local. The definition of local may exclude or include communications of either ALU 2200 or 2250 to itself.

The couplings and connection between 2300 and 2350 are similar as in FIG. 22. The ALU 2398 provides result to operand selection network via coupling 2355. The ALU 2398 adder path is split into lowest significant bits ALU 2320, and highest significant bits ALU 2321 to speed up addition operation. Rather than computing sum for 16 bits A[15:0]+B[15:0] it is split into adding A[7:0]+B[7:0] and A[15:8]+B[15:8]+carry from A[7:0]+B[7:0]. Please note that binary digits have only 2 values: 0 and 1. Therefore we may be able calculate A[15:8]+B[15:8]+0 and A[15:8]+B[15:8]+1 and then use carry from A[7:0]+B[7:0] computed in 2320 sent vial coupling 2330 and 2332 to select result A[15:8]+B[15:8]+0 if 2330 is 0 and select result A[15:8]+B[15:8]+1 if 2330 is 1. The selection for result of A+B sent to operand selection 2355 network via 2310 after being selected by 2322, where 2340 has result of A[15:8]+B[15:8]+0 and 2341 has result A[15:8]+B[15:8]+0, and 2322 select 2340 is 2330 is 0 and select 2341 if 2330 is 1. The same concept applies for 2313.

Since A[15:8]+B[15:8]+0 and A[15:8]+B[15:8]+1 can be calculated without knowing result of carry of A[7:0]+B[7:0] without waiting on carry 2330 which is same signal as 2332. Now, the result can be pre-computed and the final result selected, based on 2330 (2332 is same signal). The 2330 is routed from the middle of ALU.

Figure 24:
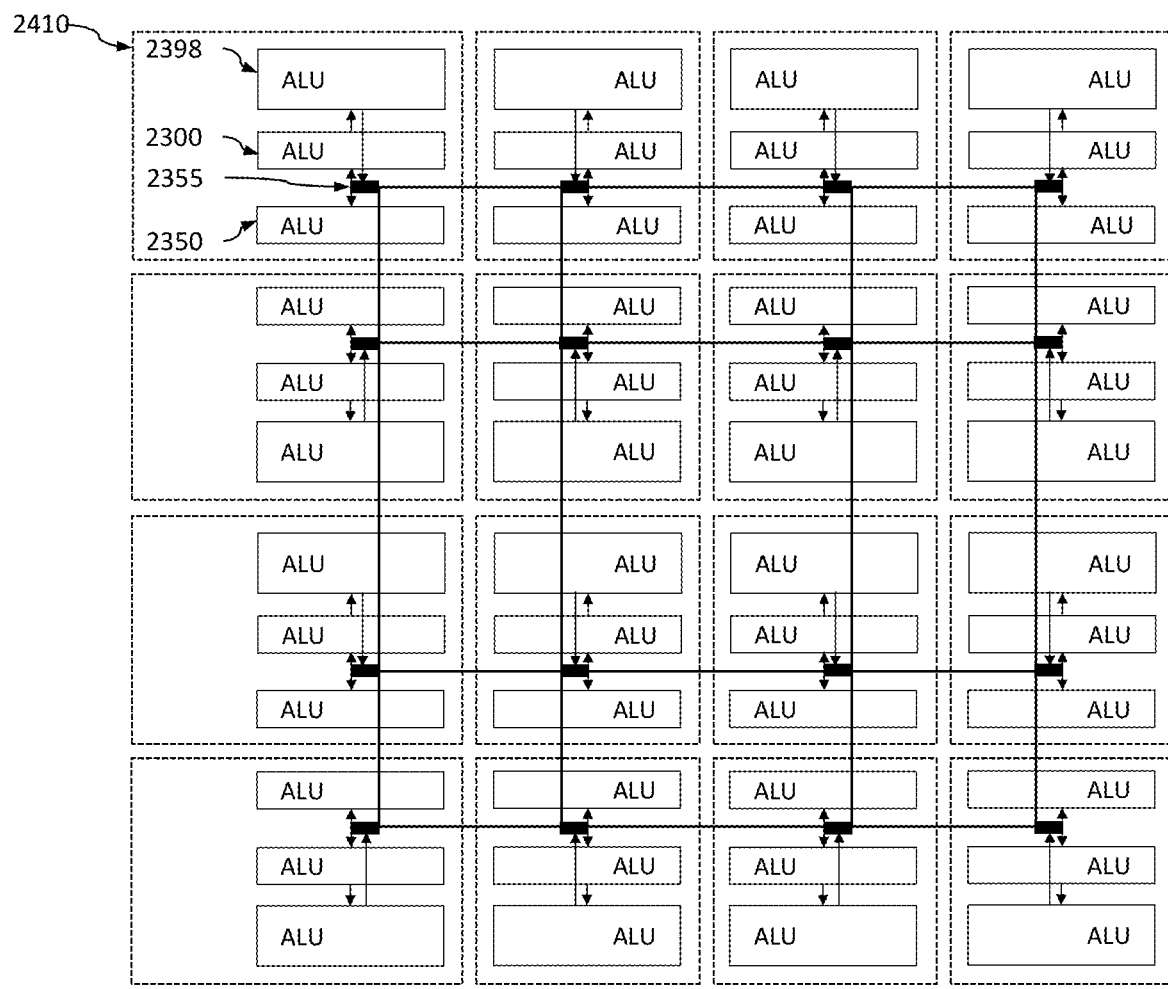
FIG. 24 shows groups of ALUs of FIG. 24.

FIG. 24 shows a higher level layout of FIG. 23 in combination with other ALUs in the same layout. Operand switch units within operand switch network/registers 215 are the pathway by which data and control signals reach the various groups of ALUs. Under the definitions of local (scope shown by 2410) discussed with respect to FIG. 23, such data and control signals are typically considered global, although certain ones may be local under the appropriate definition.

In some embodiments, there may be different definitions of local for different ALUs or different circumstances. The clock speed could be set to be long enough to account for the worst case combination of time of operation and time of transmission, plus overhead factors.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system for populating instruction words for simultaneous execution of instruction operations, the system comprising:
    a plurality of Arithmetic Logic Units (ALUs), including at least a first ALU and a second ALU, in a data path operating on a clock cycle;
    a non-transitory computer readable memory storing instructions;
    the system being programmed to implement the instructions to perform operations comprising:
        creating a dependency graph of instruction nodes, each instruction node including at least one instruction operation;
        first identifying a critical path of the dependency graph;
        first selecting, for assignment to a first ALU slot of a first instruction word corresponding to the first ALU, an end node of the identified critical path that does not violate any predetermined rule;
        first assigning to a first ALU slot the first instruction word, the selected end node;
        second selecting, for assignment to a second ALU slot of the first instruction word corresponding to the second ALU, at least one of any available dependent instruction nodes that are dependent upon a result of the selected first available instruction node and does not violate any predetermined rule, the any predetermined rule including a rule that the second ALU is physically close enough to the first ALU that the instruction operations of the end node and the available dependent instruction nodes can be executed in a common clock cycle;
        second assigning to the second ALU slot of the first instruction word, in response to the second selecting, the selected at least one of any available dependent instruction nodes;
        updating the dependency graph to remove any instruction nodes assigned during the first and second assigning from further consideration for assignment; and
        third assigning, in response to a violation during the second selecting of at least the rule that the second ALU is physically close enough to the first ALU, the selected at least one of any available dependent instruction nodes to a second instruction word different from the first instruction word.

2. The system of claim 1, the operations further comprising after the second assigning:
    determining whether the instruction word is complete or incomplete;
    returning to the first selecting in response to the instruction word being incomplete per the determining; and
    closing the instruction word in response to the instruction word being complete per the determining.

3. The system of claim 2, the operations further comprising creating a new instruction word in response to (a) the closing and (b) the dependency graph still has unassigned instruction nodes.

4. The system of claim 1, wherein the updating comprises (a) removing from the dependency graph any instruction nodes assigned during the first and second assigning, or (b) marking any instruction nodes assigned during the first and second assigning as unavailable for further assignment to the instruction word.

5. The system of claim 1, the operations further comprising, in response to absence of an available node during the first selecting:
    bypassing the first assigning, second selecting and second assigning.

6. A method for populating an instruction word for simultaneous execution of instruction operations by a plurality of Arithmetic Logic Units (ALUs) in a data path, including at least a first ALU and a second ALU, the method comprising:
    creating a dependency graph of instruction nodes, each instruction node including at least one instruction operation;
    first identifying a critical path of the dependency graph;
    first selecting, for assignment to a first ALU slot of a first instruction word corresponding to the first ALU, an end node of the identified critical path that does not violate any predetermined rule;
    first assigning the selected end node to a first ALU slot of the first instruction word;
    second selecting, for assignment to a second ALU slot of the first instruction word corresponding to the second ALU, at least one of any available dependent instruction nodes that are dependent upon a result of the selected first available node and do not violate any predetermined rule, the any predetermined rule including a rule that the second ALU is physically close enough to the first ALU that the instruction operations of the end node and the available dependent instruction nodes can be executed in a common clock cycle;

second assigning to the second ALU slot of the first instruction word, in response to the second selecting, the selected at least one of any available dependent instruction nodes;

updating the dependency graph to remove any instruction nodes assigned during the first and second assigning from further consideration for assignment; and third assigning, in response to a violation during the second selecting of at least the rule that the second ALU is physically close enough to the first ALU, the selected at least one of any available dependent instruction nodes to a second instruction word different from the first instruction word.

7. The method of claim 6, further comprising after the second assigning:

determining whether the instruction word is complete or incomplete;

returning to the first selecting in response to the instruction word being incomplete per the determining; and closing the instruction word in response to the instruction word being complete per the determining.

8. The method of claim 7, further comprising creating a new instruction word in response to (a) the closing and (b) the dependency graph still has unassigned instruction nodes.

9. The method of claim 6, wherein the updating comprises (a) removing from the dependency graph any instruction nodes assigned during the first and second assigning, and/or (b) marking any instruction nodes assigned during the first and second assigning as unavailable for further assignment to the instruction word.

10. The method of claim 6, further comprising, in response to absence of an available node during the first selecting:

bypassing the first assigning, second selecting and second assigning.

11. A non-transitory computer readable media storing instructions for populating instruction words for simultaneous execution of instruction operations by a plurality of Arithmetic Logic Units (ALUs) in a data path, which when executed by a system, cause the system to perform operations comprising:

creating a dependency graph of instruction nodes, each instruction node including at least one instruction operation;

first identifying a critical path of the dependency graph;

first selecting, for assignment to a first ALU slot of a first instruction word corresponding to the first ALU, an end node of the identified critical path that does not violate any predetermined rule;

first assigning the selected end node to a first ALU slot the first instruction word;

second selecting, for assignment to a second ALU slot of the first instruction word corresponding to the second ALU, at least one of any available dependent instruction nodes that are dependent upon a result of the selected first available instruction node and do not violate any predetermined rule, the any predetermined rule including a rule that the second ALU is physically close enough to the first ALU that the instruction operations of the end node and the available dependent instruction nodes can be executed in a common clock cycle;

second assigning to the second ALU slot of the first instruction word, in response to the second selecting, the selected at least one of any available dependent instruction nodes; and updating the dependency graph to remove any instruction nodes assigned during the first and second assigning from further consideration for assignment; and third assigning, in response to a violation during the second selecting of at least the rule that the second ALU is physically close enough to the first ALU, the selected at least one of any available dependent instruction nodes to a second instruction word different from the first instruction word.

12. The non-transitory computer readable media of claim 11, the operations further comprising after the second assigning:

determining whether the instruction word is complete or incomplete;

returning to the first selecting in response to the instruction word being incomplete per the determining; and closing the instruction word in response to the instruction word being complete per the determining.

13. The non-transitory computer readable media of claim 12, the operations further comprising creating a new instruction word in response to (a) the closing and (b) the dependency graph still has unassigned instruction nodes.

14. The non-transitory computer readable media of claim 11, wherein the updating comprises (a) removing from the dependency graph any instruction nodes assigned during the first and second assigning, or (b) marking any instruction nodes assigned during the first and second assigning as unavailable for further assignment to the instruction word.

15. The non-transitory computer readable media of claim 11, the operations further comprising, in response to absence of an available node during the first selecting:

bypassing the first assigning, second selecting and second assigning.

* * * * *